(12) United States Patent
Sakano et al.

(10) Patent No.: US 11,351,986 B2
(45) Date of Patent: Jun. 7, 2022

(54) IN-VEHICLE PROCESSING APPARATUS

(71) Applicant: CLARION CO., LTD., Saitama (JP)

(72) Inventors: Morihiko Sakano, Tokyo (JP); Shinya Tagawa, Saitama (JP); Masahiro Kiyohara, Saitama (JP)

(73) Assignee: CLARION CO., LTD., Saitama (JP)

( * ) Notice: Subject to any disclaimer, the term of this patent is extended or adjusted under 35 U.S.C. 154(b) by 28 days.

(21) Appl. No.: 16/633,510

(22) PCT Filed: Jul. 12, 2018

(86) PCT No.: PCT/JP2018/026327
§ 371 (c)(1),
(2) Date: Jan. 23, 2020

(87) PCT Pub. No.: WO2019/021842
PCT Pub. Date: Jan. 31, 2019

(65) Prior Publication Data
US 2021/0129832 A1    May 6, 2021

(30) Foreign Application Priority Data

Jul. 27, 2017 (JP) .............................. JP2017-145086

(51) Int. Cl.
*B60W 30/06* (2006.01)
*B60W 50/08* (2020.01)
(Continued)

(52) U.S. Cl.
CPC ............ *B60W 30/06* (2013.01); *B60W 10/18* (2013.01); *B60W 50/082* (2013.01);
(Continued)

(58) Field of Classification Search
CPC ......... G01C 21/28; G01C 21/30; G01C 21/32
See application file for complete search history.

(56) References Cited

U.S. PATENT DOCUMENTS

2016/0282128 A1* 9/2016 Zeng ..................... G01S 19/42
2018/0129890 A1* 5/2018 Mielenz ............... G05D 1/0088
(Continued)

FOREIGN PATENT DOCUMENTS

DE    10 2013015 348 A1    4/2014
JP        2005-265494 A     9/2005
(Continued)

OTHER PUBLICATIONS

Extended European Search Report dated Mar. 23, 2021 for corresponding European Application No. 18837796.4 (10 pages).
(Continued)

*Primary Examiner* — Anshul Sood
(74) *Attorney, Agent, or Firm* — Lewis Roca Rothgerber Christie LLP

(57) ABSTRACT

The present invention aims at obtaining an in-vehicle processing apparatus for automatically selecting modes. An in-vehicle processing apparatus 120 according to the present invention includes a mode switching unit 121D that makes a transition, based on latitude-longitude positioning information of a vehicle, between: a map storage mode 202 to acquire and store point group data in a storage unit when a vehicle 1 approaches a preset registered spot and point group data of surroundings of the vehicle is not stored in the storage unit 124; and a position estimation mode 203 to have a position estimation unit 121C estimate a position of the vehicle when the vehicle approaches the registered spot and the point group data of surroundings of the vehicle is stored in the storage unit.

6 Claims, 15 Drawing Sheets

(51) Int. Cl.
  *B60W 60/00* (2020.01)
  *G08G 1/16* (2006.01)
  *B60W 10/18* (2012.01)
  *B60W 10/04* (2006.01)
  *B60W 10/20* (2006.01)

(52) U.S. Cl.
  CPC ......... *B60W 60/0051* (2020.02); *G08G 1/168* (2013.01); *B60W 10/04* (2013.01); *B60W 10/20* (2013.01)

(56) References Cited

U.S. PATENT DOCUMENTS

| | | | |
|---|---|---|---|
| 2018/0188039 A1* | 7/2018 | Chen | B60W 40/06 |
| 2018/0188372 A1* | 7/2018 | Wheeler | G06K 9/00825 |
| 2020/0151611 A1* | 5/2020 | McGavran | H04W 4/44 |

FOREIGN PATENT DOCUMENTS

| | | |
|---|---|---|
| JP | 2007-55378 A | 3/2007 |
| JP | 2009-90927 A | 4/2009 |
| JP | WO2014/002223 A1 | 1/2014 |
| JP | 2015-72651 A | 4/2015 |

OTHER PUBLICATIONS

International Search Report with English translation, and Written Opinion of corresponding PCT/JP2018/026327, dated Oct. 16, 2018, 8 pages.
Japanese Office Action dated Jul. 7, 2020 regarding Japanese Patent Application No. 2017-145086 corresponding to U.S. Appl. No. 16/633,510 (5 pages) with English Translation (5 pages).
Chinese Office Action dated Jul. 27, 2021 regarding Chinese Patent Application No. 20188049840.3 corresponding to U.S. Appl. No. 16/633,510 (22 pages) with English Translation.
Communication to pursuant to Article 94(3) dated Mar. 29, 2022 for corresponding European Application No. 18837796.4 (6 pages).

* cited by examiner

FIG.9A
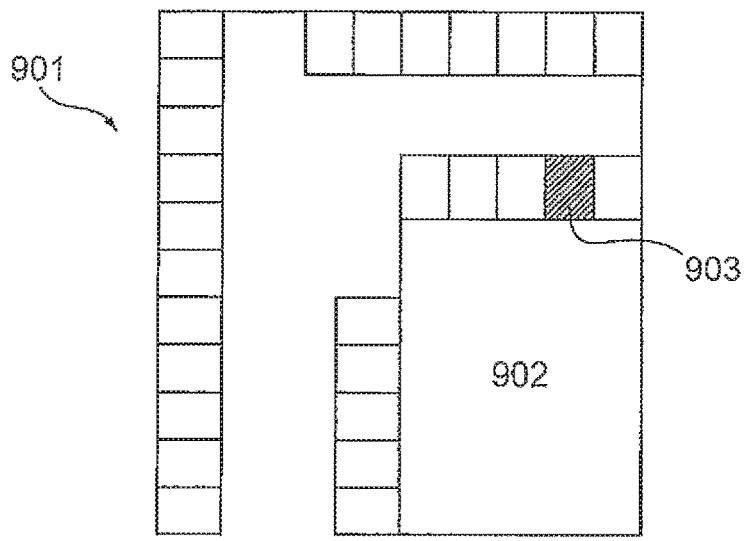
FIG.9B
— RECORDED
------ UNRECORDED
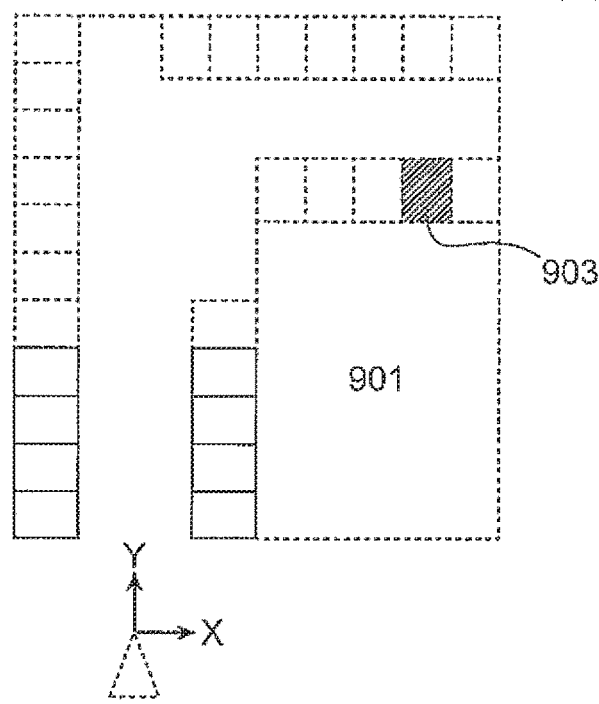

— RECORDED
----- UNRECORDED

—— PARKING SPACE POINT GROUP
------- LOCAL PERIPHERAL INFORMATION

—— PARKING SPACE POINT GROUP
······· LOCAL PERIPHERAL INFORMATION

IN-VEHICLE PROCESSING APPARATUS

CROSS-REFERENCE TO RELATED APPLICATIONS

This application is a U.S. National Phase Patent Application and claims priority to and the benefit of International Application Number PCT/JP2018/026327, filed on Jul. 12, 2018, which claims priority to Japanese Patent Application Number 2017-145086, filed on Jul. 27, 2017, the entire contents of both of which are incorporated herein by reference

TECHNICAL FIELD

The present invention relates to an in-vehicle processing apparatus.

BACKGROUND ART

Automatic parking apparatuses and parking assistance apparatuses for controlling behaviors of a vehicle and automatically driving it to a specified position have been being proposed.

PTL 1 discloses a parking assistance apparatus including: a storage means that stores a trajectory of a representative point(s) within an image of surroundings of a vehicle, which was captured by an image capturing means mounted in a vehicle when a driver parked the vehicle at the parking position in the past, by associating the trajectory with information about driving operation by the driver at that time; and a control means that detects representative points in images, which are captured by the image capturing means, of the surroundings of the vehicle when guiding the vehicle to the parking position and controls behaviors of the vehicle so that current detected represent points follow a trajectory of past representative points stored in the storage means.

CITATION LIST

Patent Literature

PTL 1: Japanese Patent Application Laid-Open (Kokai) Publication No. 2007-055378.

SUMMARY OF THE INVENTION

Problems to be Solved by the Invention

PTL 1 selects a mode from three operating modes, that is, a "storage mode," a "parking mode," and a "normal mode" according to an operation input by a passenger of a driver's own vehicle; however, it is necessary to stop the vehicle once when selecting the mode, so that the operation is burdensome. If the mode selection should be performed while driving the vehicle and if there is only one passenger, it would be dangerous to perform the operation while the vehicle is running.

The present invention was devised in light of the above-described circumstances and it is an object of the invention to provide an in-vehicle processing apparatus for automatically performing the mode selection.

Means to Solve the Problems

An in-vehicle processing apparatus according to the present invention to solve the above-described problems include:

a storage unit that stores point group data including a plurality of coordinates of points representing a part of an object in a first coordinate system by associating the point group data with latitude-longitude positioning information;

a sensor input unit that acquires an output of a sensor for acquiring information of surroundings of a vehicle;

a movement information acquisition unit that acquires information about movements of the vehicle;

a local peripheral information creation unit that generates local peripheral information including a position of the vehicle in a second coordinate system and a plurality of coordinates of points representing a part of an object in the second coordinate system on the basis of the information acquired by the sensor input unit and the movement information acquisition unit;

a position estimation unit that estimates a relationship between the first coordinate system and the second coordinate system on the basis of the point group data and the local peripheral information and estimates the position of the vehicle in the first coordinate system; and a mode switching unit that makes a transition between a map storage mode for acquiring and storing the point group data in the storage unit when the vehicle approaches a preset registered spot and the point group data of the surroundings of the vehicle is not stored in the storage unit, and a position estimation mode for having the position estimation unit estimate the position of the vehicle when the vehicle approaches the registered spot and the point group data of the surroundings of the vehicle is stored in the storage unit, on the basis of the latitude-longitude positioning information of the vehicle.

Advantageous Effects of the Invention

The present invention makes it possible to automatically switch to an appropriate mode while driving, without the operation input by the passenger of the driver's own vehicle and the driver will be relieved from the burden of stopping the driver's own vehicle and inputting the operation before storing a map or parking the vehicle. Therefore, the driver can switch from manual driving to automatic driving or automatic parking very smoothly.

Further features relating to the present invention will become apparent from the statement of this description and the attached drawings. Furthermore, problems, configurations, and advantageous effects other than those described above will become apparent from the description of embodiments below.

BRIEF DESCRIPTION OF DRAWINGS

FIG. 9A is a plane view illustrating an example of a parking space 901;

FIG. 9B is a diagram visualizing point groups of landmarks saved in a RAM 122;

DESCRIPTION OF EMBODIMENTS

An embodiment of an in-vehicle processing apparatus according to the present invention will be explained below with reference to FIG. 1 to FIG. 15.

Figure 1:
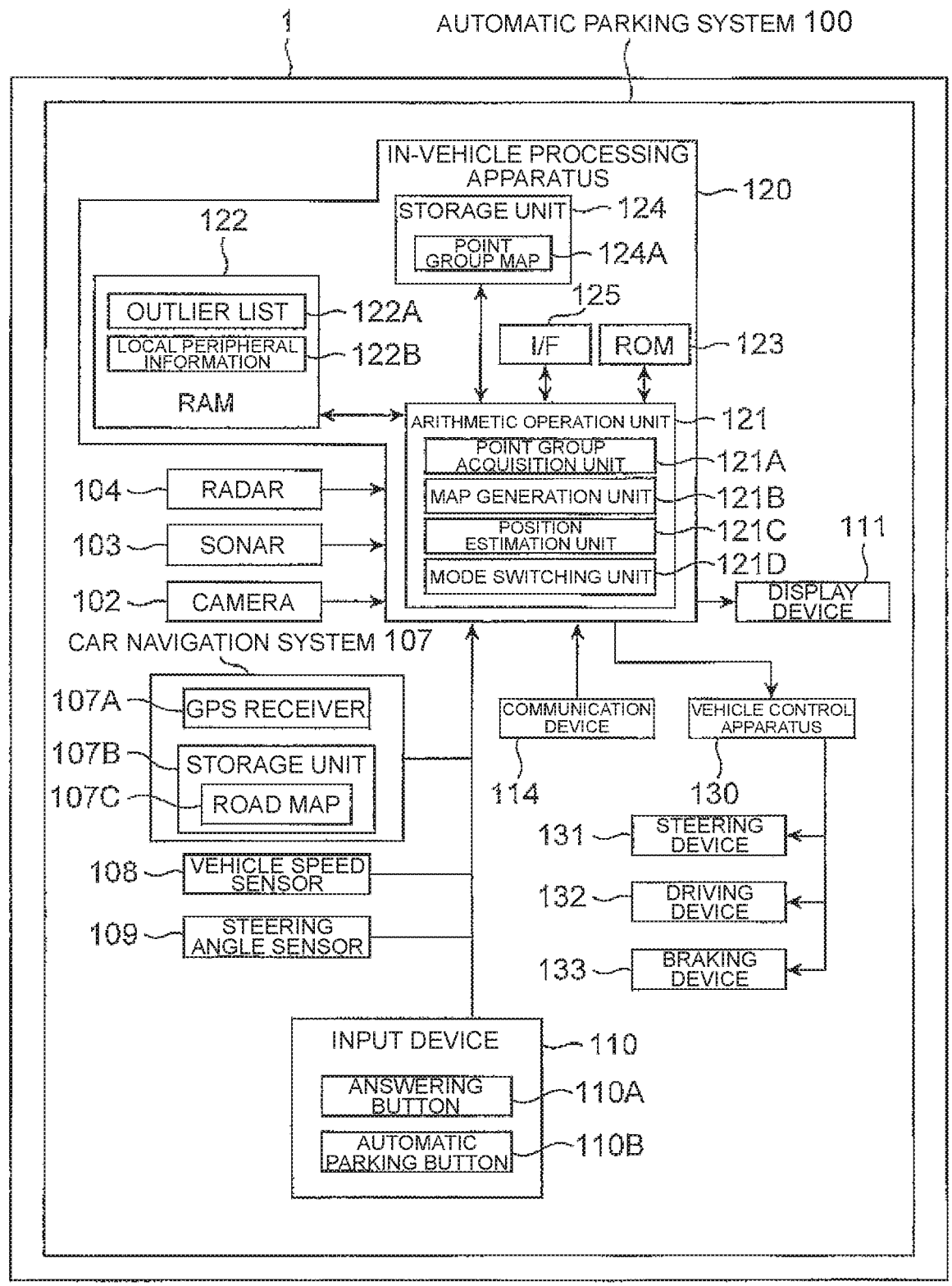
FIG. 1 is a configuration diagram of an automatic parking system 100 including an in-vehicle processing apparatus according to the present invention.

FIG. 1 is a configuration diagram of an automatic parking system 100 including an in-vehicle processing apparatus according to the present invention.

The automatic parking system 100 is mounted in a vehicle 1. The automatic parking system 100 is configured of a sensor group 102 to 104, 107 to 109, an input/output device group 110, 111, 114, a control device group 130 to 133 for controlling the vehicle 1, and an in-vehicle processing apparatus 120. The sensor group, the input/output device group, and the control device group are coupled to the in-vehicle processing apparatus 120 via signal lines and send/receive various kinds of data to/from the in-vehicle processing apparatus 120.

The in-vehicle processing apparatus 120 includes an arithmetic operation unit 121, a RAM 122, a ROM 123, a storage unit 124, and an interface 125. The arithmetic operation unit 121 is a CPU, The arithmetic operation unit 121 may be configured so that whole or part of arithmetic processing will be executed by other arithmetic processing apparatuses such as FPGA, The RAM 122 is a readable/writable storage area and operates as a main storage device for the in-vehicle processing apparatus 120. The RAM 122 stores an outlier list 122A described later and local peripheral information 122B described later. The ROM 123 is a read-only storage area and stores a program described later. This program is deployed in the RAM 122 and executed by the arithmetic operation unit 121, As the arithmetic operation unit 121 reads and executes the program, it operates as a point group acquisition unit 121A, a map generation unit 121B, a position estimation unit 121C, and a mode switching unit 121D.

The storage unit 124 is a nonvolatile storage device and operates as an auxiliary storage device for the in-vehicle processing apparatus 120. The storage unit 124 stores a point group map 124A, The point group map 124A is, for example, one or more pieces of parking space data. The parking space data is positional information of a certain parking space, that is, the latitude and the longitude, coordinates representing a parking area, and a set of coordinates of points constituting a landmark(s) existing at the parking space. The landmark(s) will be explained later. The interface 125 sends/receives information to/from other equipment constituting the in-vehicle processing apparatus 120 and the automatic parking system 100.

The sensor group includes: a camera 102 for capturing images of the surroundings of the vehicle 1; a sonar 103 and radar 104 for observing whether an object(s) exists in the surroundings of the vehicle 1 or not; a car navigation system 107; a vehicle speed sensor 108; and a steering angle sensor 109.

The camera 102 outputs an image(s) captured and thereby obtained (hereinafter referred to as the captured image(s)) to the in-vehicle processing apparatus 120. The in-vehicle processing apparatus 120 performs landmark positioning described later by using the image(s) captured by the camera 102, Internal parameters such as a focal length and image sensor size of the camera 102 and external parameters such as a mounting position and mounting attitude of the camera 102 in the vehicle 1 are already known and are saved in the ROM 123 in advance. The in-vehicle processing apparatus 120 can calculate a positional relationship between an object and the camera 102 by using the internal parameters and the external parameters which are stored in the ROM 123.

The sonar 103 and the radar 104 observe a reflection object position(s) by measuring time required to radiate an acoustic wave and a radio wave of a specified wavelength, respectively, and then receive the reflected waves which are reflected and return from the object. The sonar 103 and the radar 104 observe the reflection object position as a point group and outputs it to the in-vehicle processing apparatus 120.

The car navigation system 107 includes a GPS receiver 107A and a storage unit 107B. The storage unit 107B is a nonvolatile storage device and stores a road map 107C. The road map 107C includes information about a road connection structure and the latitude and longitude corresponding to a road position. The car navigation system 107 checks positional information by the GPS receiver 107A and the corresponding road map 107C by comparing them with each other and calculates the latitude and the longitude of the road position (navigated self-position) where the driver's own vehicle is running. Incidentally, the precision of the latitude and longitude calculated by the car navigation system 107 does not have to be high precision and, for example, may include an error to a degree of several meters to 10 m. The car navigation system 107 outputs the calculated latitude and longitude and a road identification number to the in-vehicle processing apparatus 120.

The GPS receiver 107A receives signals from a plurality of satellites constituting a satellite navigation system and calculates the position, i.e., the latitude and longitude, of the GPS receiver 107A according to an arithmetic operation based on the received signals. Incidentally, the precision of the latitude and longitude calculated by the GPS receiver 107A does not have to be high precision and, for example, may include an error to a degree of several meters to 10 m. The GPS receiver 107A outputs the calculated latitude and longitude to the car navigation system 107 or the in-vehicle processing apparatus 120.

The vehicle speed sensor 108 and the steering angle sensor 109 measure a vehicle speed and a steering angle of the vehicle 1, respectively, and output them to the in-vehicle processing apparatus 120. The in-vehicle processing apparatus 120 calculates a travel amount and a movement direction of the vehicle 1 according to the known dead reckoning technology by using the outputs from the vehicle speed sensor 108 and the steering angle sensor 109.

A user's operating commands to the in-vehicle processing apparatus 120 are input to the input device 110. The input device 110 includes an answering button 110A and an automatic parking button 110B. The display device 111 is, for example, a liquid crystal display and displays information which is output from the in-vehicle processing apparatus 120. Incidentally, the input device 110 and the display device 111 may be integrated together and be configured as, for example, a liquid crystal display which responds to touch operation. In this case, as a specified area of the liquid crystal display is touched, it may be determined that the operation to press the answering button 110A or the automatic parking button 110B is performed.

The communication device 114 is used to send/receive information to/from external equipment of the vehicle 1 and the in-vehicle processing apparatus 120 by using wireless communication. For example, when the user is outside the vehicle 1, he/she performs communication with a mobile terminal which the user carries with him/her and thereby sends/receives information. The target with which the communication device 114 performs the communication is not limited to the user's mobile terminal.

The vehicle control apparatus 130 controls a steering device 131, a driving device 132, and a braking device 133 based on operating commands from the in-vehicle processing apparatus 120. The steering device 131 operates steering of the vehicle 1. The driving device 132 gives a driving force to the vehicle 1. The driving device 132 increases the driving force of the vehicle 1 by, for example, increasing the target number of revolutions of an engine with which the vehicle 1 is equipped. The braking device 133 gives a braking force to the vehicle 1.

(Landmark Positioning)

A landmark(s) is an object(s) having features which can be identified by a sensor(s) and is, for example, a parking frame line which is one type of road surface paint or a building wall which is an obstacle which blocks traveling of the vehicle. In this embodiment, vehicles and humans that are mobile objects are not included in the landmarks. The in-vehicle processing apparatus 120 detects landmarks existing around the vehicle 1, that is, points having features which can be identified by the sensors, on the basis of information which is input from at least one of the camera 102, the sonar 103, and the radar 104. In the following explanation, the landmark detection based on the information which is input from the external sensors, that is, the information which is input from at least one of the camera 102, the sonar 103, and the radar 104 will be referred to as "landmark positioning."

The in-vehicle processing apparatus 120 detects, for example, the road surface paint such as a parking frame(s) by operating an image recognition program targeted at images captured by the camera 102. The parking frame(s) is detected by firstly extracting edges from an input image via a Sobel filter or the like. Next, for example, a pair of a rising edge which is a change from white to black and a falling edge which is a change from black to white. Then, when the distance between this pair becomes substantially identical to a predetermined first specified distance, that is, the width of a white line constituting the parking frame, this pair is determined as a parking frame candidate, A plurality of parking frame candidates are detected by the same processing as described above; and when the distance between the parking frame candidates becomes substantially identical to a predetermined second specified distance, that is, the distance between white lines which are the parking frames, these parking frame candidates are detected as parking frames. The road surface paint other than the parking frames is detected by an image recognition program for executing the following processing.

Firstly, edges are extracted from the input image by using, for example, the Sobel filter. The edges can be detected by searching for pixels whose edge strength is larger than a predetermined certain value and regarding which the distance between the edges is a predetermined distance corresponding to the width of the white line.

The in-vehicle processing apparatus 120 detects vehicles and humans by, for example, already known template matching and excludes them from the measurement results. Also, a mobile object(s) detected as described below may be excluded from the measurement results. Specifically speaking, the in-vehicle processing apparatus 120 calculates a positional relationship between an object in a captured image and the camera 102 by using the internal parameters and the external parameters, Next, the in-vehicle processing apparatus 120 calculates a relative speed of the vehicle 1 and the object by tracking the object in captured images obtained continuously by the camera 102. Lastly, the in-vehicle processing apparatus 120 calculates the speed of the vehicle 1 by using outputs from the vehicle speed sensor 108 and the steering angle sensor 109; and if the speed of the vehicle 1 does not match the relative speed of the object, it is determined that the object is a mobile object, and the information about this mobile object is excluded from the measurement results.

(Point Group Map 124A)

Figure 2:
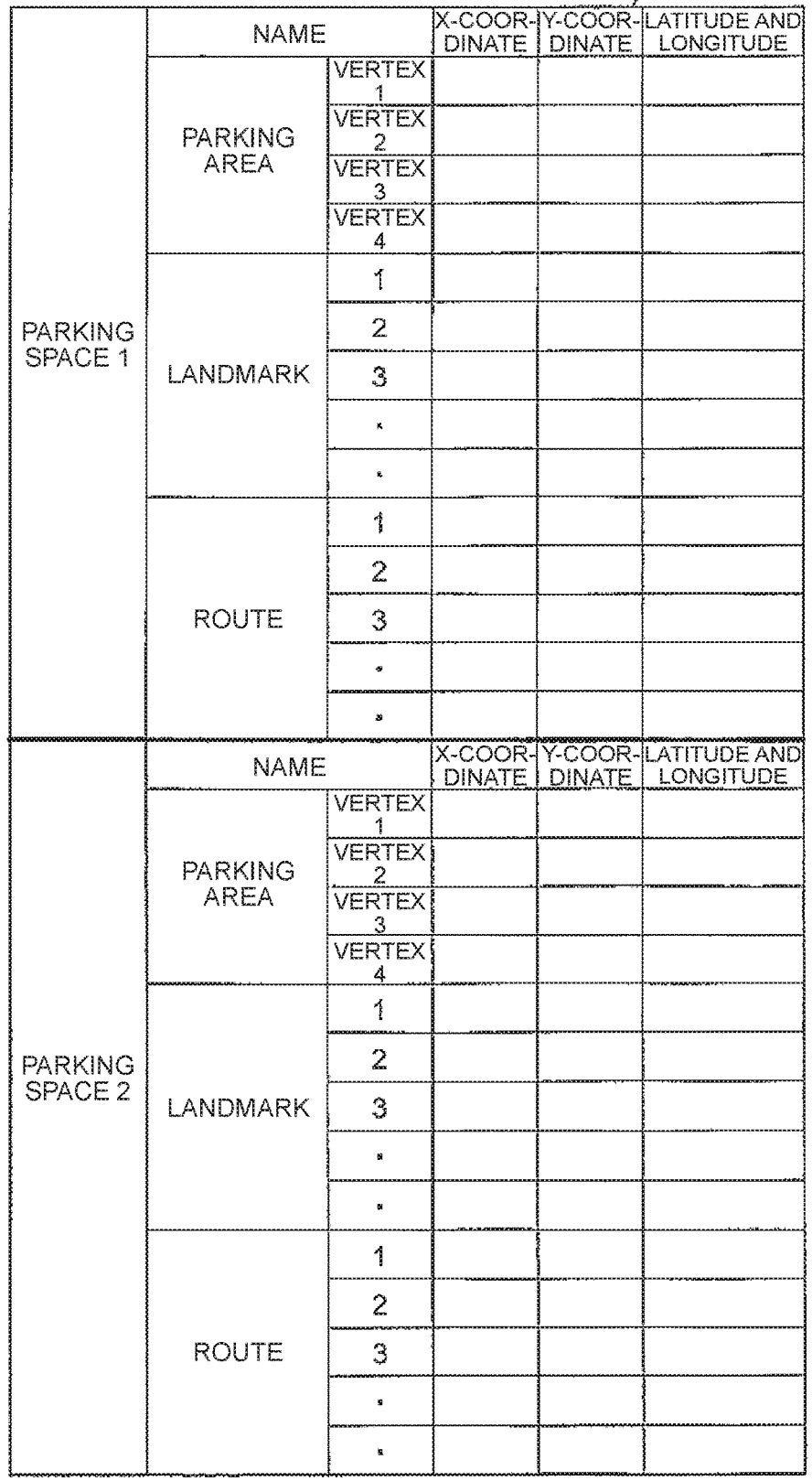
FIG. 2 is a diagram illustrating an example of a point group map 124A.

FIG. 2 is a diagram illustrating an example of the point group map 124A stored in the storage unit 124. FIG. 2 illustrates an example where two pieces of parking space data are stored as the point group map 124A. Each piece of the parking space data is configured of coordinates of a parking area, coordinates of points constituting landmarks on a two-dimensional plane, coordinates of routes along which the vehicle traveled when stored, and the latitude and longitude corresponding to each coordinate. The coordinates of the parking area and the coordinates of the points constituting the landmarks are the coordinates in a coordinate system specific to the relevant parking space data (a first coordinate system). The coordinate system for the parking space data will be hereinafter referred to as the "parking space coordinate system." The parking space coordinate system is designed so that, for example, the coordinates of the vehicle 1 at the start of recording are set as an origin; a traveling direction of the vehicle 1 at the start of recording is set as a Y-axis; and the right direction of the vehicle 1 at the start of recording is set as an X-axis. Assuming that, for example, a parking area is rectangular, the coordinates of a parking area are recorded as coordinates of four vertexes of the rectangular area. However, the shape of the parking area is not limited to rectangular, and the parking area may be of a polygonal or elliptic shape other than the rectangular shape.

(Outlier List 122A)

The outlier list 122A stores information about points of the local peripheral information 122B which is not subject to the processing by the in-vehicle processing apparatus 120. The outlier list 122A is updated by the in-vehicle processing apparatus 120 as described later as the need arises.

(Local Peripheral Information 122B)

The local peripheral information 122B stores the coordinates of the points constituting the landmarks detected by the in-vehicle processing apparatus 120 in a position estimation mode 203 described later. These coordinates are coordinates in a coordinate system based on the position and attitude of the vehicle 1 when recording of the local peripheral information 122B is started, regarding which, for example, such position and attitude of the vehicle 1 are set as an origin, the traveling direction of the vehicle 1 is set as a Y-axis, and the right side of the traveling direction is set as an X-axis (a second coordinate system). This coordinate system will be hereinafter referred to as the "local coordinate system."

(Operation Outline of In-vehicle Processing Apparatus 120)

Figure 3:
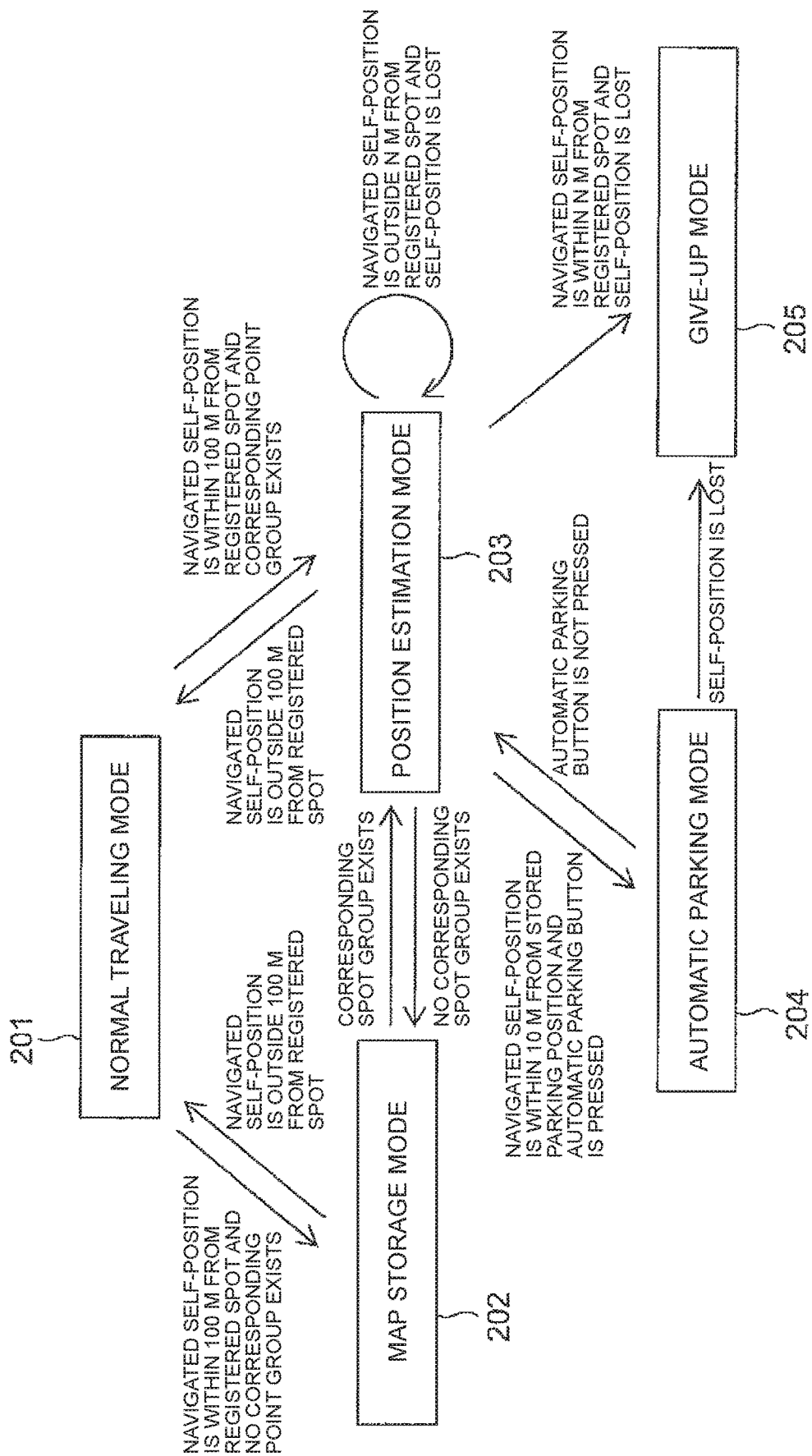
FIG. 3 is a diagram illustrating operating modes and their transition conditions of an in-vehicle processing apparatus 120.

The operation outline of the in-vehicle processing apparatus 120 will be explained. FIG. 3 is a diagram for explaining operating modes and their transition conditions of the in-vehicle processing apparatus 120. Operations explained in this drawing are equal to operations of the mode switching unit 121D for the in-vehicle processing apparatus 120. The in-vehicle processing apparatus 120 has mainly five operating modes, that is, a normal traveling mode 201, a map storage mode 202, a position estimation mode 203, an automatic parking mode 204, and a give-up mode 205. The in-vehicle processing apparatus 120 starts controlling mode switching from the normal traveling mode 201.

In the normal traveling mode 201, the vehicle 1 is driven by the user. When this happens, neither the generation of the point group map nor the self-position estimation on the point group map is performed and only monitoring of the mode transition conditions is performed. The mode transition is performed by comparing the latitude and longitude of the vicinity of a previously registered spot where the user wants to park the vehicle (registered spot) with latitude-longitude information of the self-position acquired from the car navigation system 107 (navigated self-position); and when the driver's own vehicle enters an area within a certain range centered at the registered spot, for example, when the navigated self-position enters an area within the range of 100 m from the registered spot, the mode transition is performed.

When a point group map of the vicinity of the current traveling spot is not registered, the transition is made to the map storage mode 202; and when the point group map of the vicinity of the currently traveling spot is registered, the transition is made to the position estimation mode 203. Whether the point group map of the vicinity is registered or not is judged based on the latitude-longitude information corresponding to the landmarks. The latitude-longitude information of the self-position is compared with the latitude-longitude information of the landmarks; and if there is a landmark within a previously determined distance, it is judged that the map has already been registered; and if there is no landmark within the previously determined distance, it is judged that the map has not been registered.

In the map storage mode 202, the vehicle 1 is driven by the user and the in-vehicle processing apparatus 120 collects the parking space data, that is, information about white lines and obstacles existing in the parking space, information about the parking position, and information about the traveling route on the basis of the information from the sensors with which the vehicle 1 is equipped. The in-vehicle processing apparatus 120 stores the collected information, as the point group map 124A, in the storage unit 124.

Regarding the mode transition, the latitude and longitude of the vicinity of the previously registered spot where the user wants to park the vehicle (the registered spot) are compared with the latitude-longitude information of the self-position acquired from the car navigation system 107; and if the self-position is located out of the area within the certain range centered at the registered spot, for example, if the navigated self-position moves away from the registered spot and the distance between them becomes 100 m or more, the transition is made from the map storage mode 202 to the normal traveling mode 201. Furthermore, if the driver's own vehicle enters a registered section in the point group map on their way, the transition is made from the map storage mode 202 to the position estimation mode 203.

Whether the driver's own vehicle has entered the section registered on the map or not is judged by comparing the latitude-longitude information of the self-position (the navigated self-position) with the latitude-longitude information of the landmarks and on the basis of whether or not any landmark (corresponding point group) exists within a predetermined distance from the navigated self-position as the center. Then, if the landmark exists, it is judged that the driver's own vehicle has entered the section registered on the map.

In the position estimation mode 203, the vehicle 1 is driven by the user and the in-vehicle processing apparatus 120 checks the information from the sensors, with which the vehicle 1 is equipped, against the information of the point group map 124A and estimates the position of the driver's own vehicle in the point group map. The in-vehicle processing apparatus 120 detects the white lines and obstacles existing in the surroundings of the vehicle 1 on the basis of the information from the sensors and checks them against the point group map 124A, thereby estimating the current position.

Regarding the mode transition, the latitude and the longitude of the registered spot are compared with the latitude-longitude information of the self-position acquired from the car navigation system 107; and if the driver's own vehicle moves out of the area within the certain range centered at the registered spot, for example, if the navigated self-position moves away from the registered spot and the distance between them becomes 100 m or more, the transition is made from the position estimation mode 203 to the normal traveling mode 201. Furthermore, if the driver's own vehicle enters an unregistered section in the point group map on their way, it is determined that there is no corresponding point group and the transition is made from the position estimation mode 203 to the map storage mode 202.

Whether the driver's own vehicle has entered the unregistered section in the point group map or not is judged by comparing the latitude-longitude information of the self-position with the latitude-longitude information of the landmarks and on the basis of whether or not any landmark (corresponding point group) exists within a predetermined distance from the self-position as the center. Then, if any landmark does not exist, it is judged that the driver's own vehicle has entered the unregistered section on the map.

Furthermore, when the position of the driver's own vehicle has been successfully estimated and the self-position is located within a specified range from the parking position and only while the user is pressing the automatic parking button 110B, the transition is made from the position estimation mode 203 to the automatic parking mode 204. Specifically speaking, automatic control is performed with the user's approval. Furthermore, if the self-position cannot be found on the point group map, the transition is made to the give-up mode 205.

In the automatic parking mode 204, the vehicle 1 is controlled by the in-vehicle processing apparatus 120 and the vehicle 1 is parked at the parking position stored in the point group map on the basis of the self-position in the point group map obtained in the position estimation mode 203 and the estimation result of the self-position in the map, which is continuously performed also in the automatic parking mode 204. The in-vehicle processing apparatus 120 continues, also in the automatic parking mode 204 after the position estimation mode 203, to detect the white lines and obstacles existing in the surroundings of the vehicle 1 on the basis of the information from the sensors and check them against the point group map 124A, thereby estimating the current position. Regarding the mode transition, when the user releases the automatic parking button 110B, the transition is made from the automatic parking mode 204 to the position estimation mode 203. Specifically speaking, the automatic parking control is stopped. Furthermore, if the self-position is lost in the state where the user is pressing the automatic parking button 110B, the transition is made to the give-up mode 205.

In the give-up mode 205, it is indicated to the user via the display device 111 that the automatic parking cannot be performed; and during this mode, none of the map storage, the position estimation, or the automatic parking is performed. Regarding the mode transition, when the user completes parking the vehicle or the driver's own vehicle moves away a predetermined specified distance from the registered spot, the transition is made to the normal traveling mode 201.

In the following explanation, the map storage mode 202, the position estimation mode 203, and the automatic parking mode 204 will be explained in detail.

(Map Storage Mode 202)

When the driver's own vehicle enters the specified range centered at the registered spot and the point group map is not recorded (no corresponding point group), the in-vehicle processing apparatus 120 makes the transition from the normal traveling mode 201 to the map storage mode 202. For example, when the navigated self-position enters a 100-m range centered at the registered spot and there is no corresponding point group, the in-vehicle processing apparatus 120 operates in the map storage mode 202. While the in-vehicle processing apparatus 120 operates in the map storage mode 202, it is displayed on a screen of the display device 111 that it is operating in the map storage mode 202. Then, when the user moves the vehicle to the parking position and stops the vehicle, and then activates the parking brake, the activation of the parking brake works as a trigger and causes the display device 111 to display a text stating that "[s]hall the surroundings of the current travel route be stored as a map?" At this stage, the user's judgment and operation are required for the first time; and the entire previous operation until the point group extraction is performed automatically without the user's judgment or operation. Then, when the user presses the answering button 110A, the map is stored and the in-vehicle processing apparatus 120 terminates the map storage mode 202, When the user does not press the answering button 110A, the surroundings of the current travel route are not stored as a map and the in-vehicle processing apparatus 120 terminates the map storage mode 202. The operation of the map storage mode 202 by the in-vehicle processing apparatus 120 is divided into two processing: extracting the point groups constituting the landmarks; and recording the extracted point groups.

The point group extraction processing by the in-vehicle processing apparatus 120 will be explained.

After making the transition to the map storage mode 202, the in-vehicle processing apparatus 120 reserves a temporary storage area in the RAM 122. Then, the in-vehicle processing apparatus 120 terminates the map storage mode 202 or repeats the following processing until it makes the transition to another mode. Specifically speaking, the in-vehicle processing apparatus 120 extracts point groups constituting landmarks on the basis of at least one of the images captured by the camera 102 and observation information of the sonar 103 and the radar 104. Furthermore, the in-vehicle processing apparatus 120 calculates the travel amount and the movement direction regarding which the vehicle 1 has traveled since the last time the camera 102 captured an image until the current image being captured, on the basis of outputs from the vehicle speed sensor 108 and the steering angle sensor 109. Then, the in-vehicle processing apparatus 120 records the extracted point groups in the RAM 122 on the basis of the positional relationship with the vehicle 1 and the travel amount and the movement direction of the vehicle 1. Furthermore, the in-vehicle processing apparatus 120 records the latitudes and longitudes, which are output from the car navigation system 107, together with the point groups. The in-vehicle processing apparatus 120 repeats this processing.

The position of the vehicle 1 and the coordinates of the point groups are recorded as coordinate values in a recording coordinate system. The "recording coordinate system" is designed so that the position of the vehicle 1 when, for example, recording is started is set as an origin (0, 0) and the coordinate values are treated as coordinate values of a coordinate system regarding which the traveling direction (attitude) of the vehicle 1 at the start of recording is set as a Y-axis and the right direction of the vehicle 1 at the start of recording is set as an X-axis. Therefore, even if point groups are recorded in the same parking space, different recording coordinate systems are set depending on the position and attitude of the vehicle 1 at the start of recording, so that the point groups constituting the landmarks are recorded at different coordinates.

The user parks the vehicle at the target parking position and pulls the parking brake. The activation of the parking brake works as a trigger and causes the display device 111 to display a text stating that "[s]hall the surroundings of the current travel route be stored as a map?" The user stores the relevant data as a map by pressing the answering button 110A, Once storing the relevant data as the map is approved, the in-vehicle processing apparatus 120 records the current position as a parking position in the RAM 122. The parking position is recorded as the coordinates of four corners when, for example, the vehicle 1 approximates a rectangular shape.

Next, the in-vehicle processing apparatus 120 executes the point group recording processing as follows.

The in-vehicle processing apparatus 120 judges whether or not the coordinates, that is, the latitude and longitude, of the recorded parking space are substantially identical to the coordinates of any one of parking spaces already recorded in the point group map 124A. When they are not substantially identical to each other, the in-vehicle processing apparatus 120 records the information of the point group, which is saved in the RAM 122, as new parking space data in the point group map 124A. When they are substantially identical to each other, the in-vehicle processing apparatus 120 judges whether or not to merge (integrate) the information of the point groups, regarding which the coordinates of the parking spaces are substantially identical to each other, into a point group of one parking space. In order to make this judgment, the in-vehicle processing apparatus 120: firstly performs coordinate transformation so that the parking position included in the parking space data matches the parking position recorded in the RAM 122; and then calculates a point group matching degree which is a degree of matching between the point group of the point group map 124A and the point group stored in the RAM 122. Then, if the calculated point group matching degree is more than a threshold value, the in-vehicle processing apparatus 120 determines to merge them; and if the calculated point group matching degree is equal to or less than the threshold value, the in-vehicle processing apparatus 120 determines to not merge them. The calculation of the point group matching degree will be described later.

When the in-vehicle processing apparatus 120 determines to not merge them, it records the point group, which is saved in the RAM 122, as new parking space data in the point group map 124A. When the in-vehicle processing apparatus 120 determines to merge them, it adds the point group saved in the RAM 122 to the existing parking space data of the point group map 124A.

(Flowchart of Storage Mode)

Figure 4:
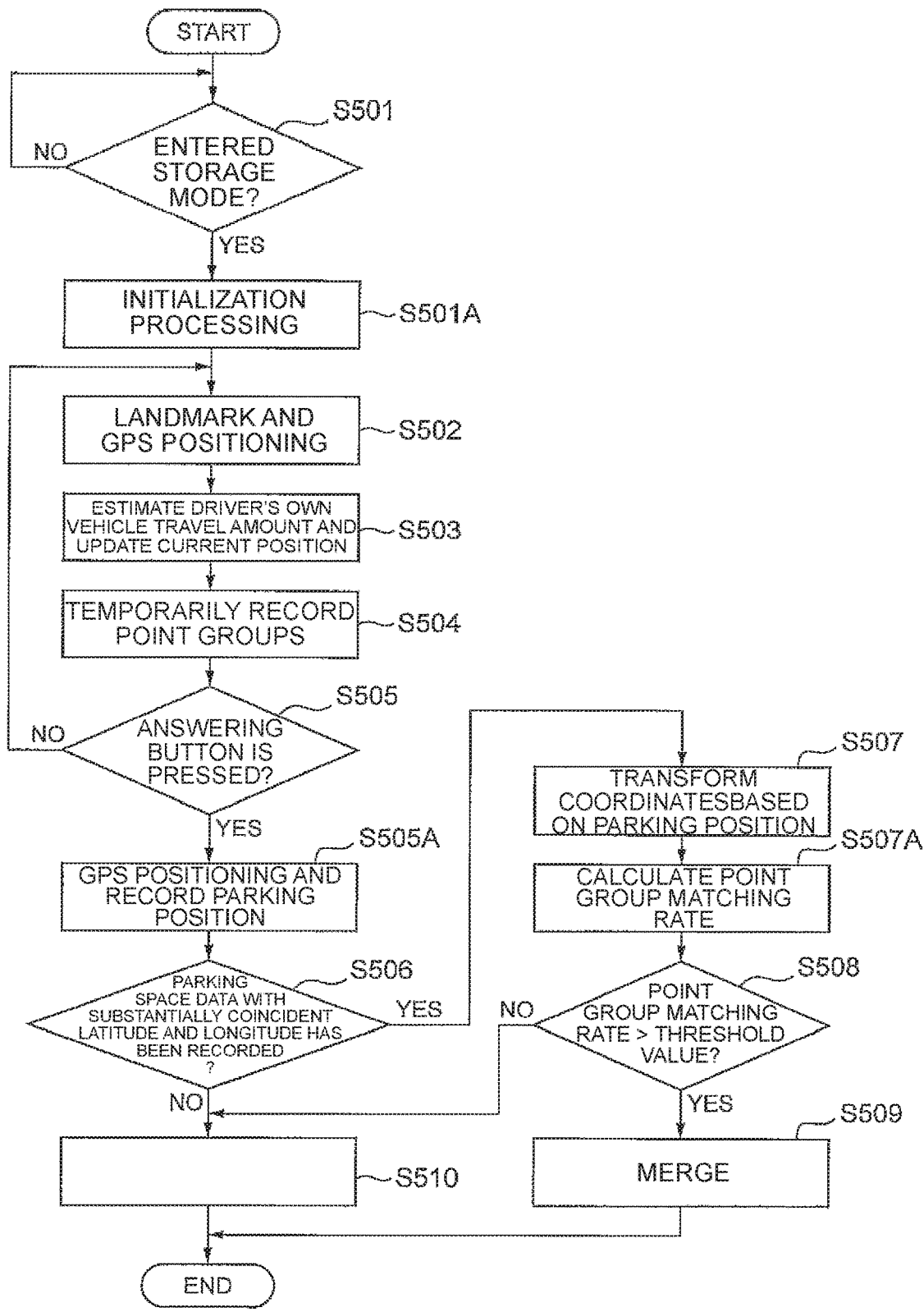
FIG. 4 is a flowchart illustrating operations of a map storage mode of the in-vehicle processing apparatus 120.

FIG. 4 is a flowchart illustrating the operation of the map storage mode 202 of the in-vehicle processing apparatus 120. A subject which executes each step explained below is the arithmetic operation unit 121 for the in-vehicle processing apparatus 120.

The arithmetic operation unit 121 functions as the map generation unit 121B when executing the processing illustrated in FIG. 4.

In step S501, whether the in-vehicle processing apparatus 120 has entered the map storage mode 202 or not is judged. When it is judged that the in-vehicle processing apparatus 120 has entered the map storage mode 202, the processing proceeds to S501A; and when the in-vehicle processing apparatus 120 has not entered the map storage mode 202, the processing stays in step S501. In step S501A, the arithmetic operation unit 121 reserves a new storage area in the RAM 122. The extracted point groups and the current position of the vehicle 1 are recorded, as coordinates in the aforementioned recording coordinate system, in this storage area.

In step S502, the arithmetic operation unit 121 acquires information from the sensor group and performs the aforementioned landmark positioning, that is, extraction of the point groups constituting the landmarks by using the image(s) captured by the camera 102, the sonar 103, and the radar 104 and linkage to latitude-longitude observation values which are output from the car navigation system 107. In the subsequent step S503, the arithmetic operation unit 121: estimates the travel amount of the vehicle 1 during a period of time after the camera 102, the sonar 103, and the radar 104 performed sensing until they perform the latest sensing; and updates the current position of the vehicle 1 in the recording coordinate system recorded in the RAM 122. The travel amount of the vehicle 1 can be estimated by a plurality of means and, for example, the travel amount of the vehicle 1 can be estimated from changes in the position of an object(s) existing on the road surface in the images captured by the camera 102 as mentioned above. The travel amount of the vehicle 1 may be estimated from the sensing results of the sonar 103 and the radar 104. Furthermore, if a high-precision GPS receiver which has little errors is mounted as the car navigation system 107, its output may be used. The travel amount of the vehicle 1 may be estimated based on the vehicle speed sensor 108 and the steering angle sensor 109. Next, the processing proceeds to step S504.

In step S504, the arithmetic operation unit 121 saves the point groups, which were extracted in step S502, as coordinates of the recording coordinate system in the RAM 122 on the basis of the current position updated in step S503.

In the subsequent step S505, the arithmetic operation unit 121 judges whether or not storage approval operation has been performed by pressing the answering button 110A; and if it is judged that the storage approval operation has been performed, the processing proceeds to step S505A; and if it is judged that the storage approval operation has not been performed, the processing returns to step S502. In step S505A, the arithmetic operation unit 121 acquires the current latitude and longitude of the vehicle 1 from the car navigation system 107 and records the parking position, that is, the current position of the vehicle 1 which is the coordinates of four corners of the vehicle 1 in the recording coordinate system. Next, the processing proceeds to step S506.

In step S506, the arithmetic operation unit 121 judges whether the parking space data having the latitude and longitude which are substantially identical to the current latitude and longitude of the vehicle 1 obtained in step S505A is recorded in the point group map 124A or not. If it is judged that the current latitude and longitude of the vehicle 1 are substantially identical to the latitude and longitude of any one piece of the parking space data recorded in the point group map 124A, the processing proceeds to step S507; and otherwise, the processing proceeds to step S510. The parking space data in the parking space data, regarding which it is judged that their latitude and longitude are substantially identical to the current latitude and longitude of the vehicle 1, will be hereinafter referred to as the target parking space data.

In step S507, the arithmetic operation unit 121 transforms the recording coordinate system, which is the coordinate system of the point group data saved in the RAM 122, to the coordinate system of the point group data of the target parking space data on the basis of the parking position. Specifically speaking, the arithmetic operation unit 121 derives a coordinate transformation formula between the recording coordinate system and the parking space coordinate system so that the parking position included in the target parking space data matches the parking position recorded in step S505A. Then, the arithmetic operation unit 121 transforms the coordinates of points constituting the landmarks saved in the recording coordinate system in the RAM 122 to the parking space coordinate system of the target parking space data.

In the subsequent step S507A, the arithmetic operation unit 121 calculates a point group matching rate IB between the point group data saved in the RAM 122 and the target parking space data. The point group matching rate IB is calculated according to Expression 1 below.

$$IB = 2*Din/(D1+D2) \qquad \text{Expression 1}$$

It should be noted that "Din" in Expression 1 represents the number of points regarding which the distance between each point of the point group data, for which the coordinate transformation was performed in step S507, and each point of the point group data of the target parking space data is within a specified distance. Furthermore, "D1" in Expression 1 represents the number of points in the point group data saved in the RAM 122 and "D2" represents the number of points in the point group data of the target parking space data. Next, the processing proceeds to step S508.

In step S508, the arithmetic operation unit 121 judges whether the point group matching rate IB calculated in step S507A is more than a specified threshold value or not. If it is judged that the point group matching rate IB is more than the threshold value, the processing proceeds to step S509; and if it is judged that the point group matching rate IB is equal to or less than the threshold value, the processing proceeds to step S510.

In step S509, the arithmetic operation unit 121 executes merge processing, that is, adds the point group data, regarding which the coordinate transformation was performed in step S507, to the target parking space data of the point group map 124A stored in the storage unit 124. In step S510 which is executed when the negative judgment is made in step S506 or step S508, the arithmetic operation unit 121 records the point group data saved in the RAM 122, and the latitude and longitude, and the parking position of the vehicle 1, which were recorded in step S505A, as new parking space data in the point group map 124A. Then, the arithmetic operation unit 121 terminates the flowchart in FIG. 4.

(Position Estimation Mode 203)

When the user drives the vehicle 1 and moves it to the vicinity of the registered spot and it is determined that the point group map of the surroundings has already been stored, the transition is made from the normal traveling mode 201 to the position estimation mode 203. For example, when the navigated self-position enters a 100-m range centered at the registered spot and if there is a corresponding point group, the position estimation mode 203 is activated. The operation of the in-vehicle processing apparatus 120 under this circumstance will be explained below according to the relevant flowchart.

(Flowchart of Position Estimation Mode 203)

Figure 5:
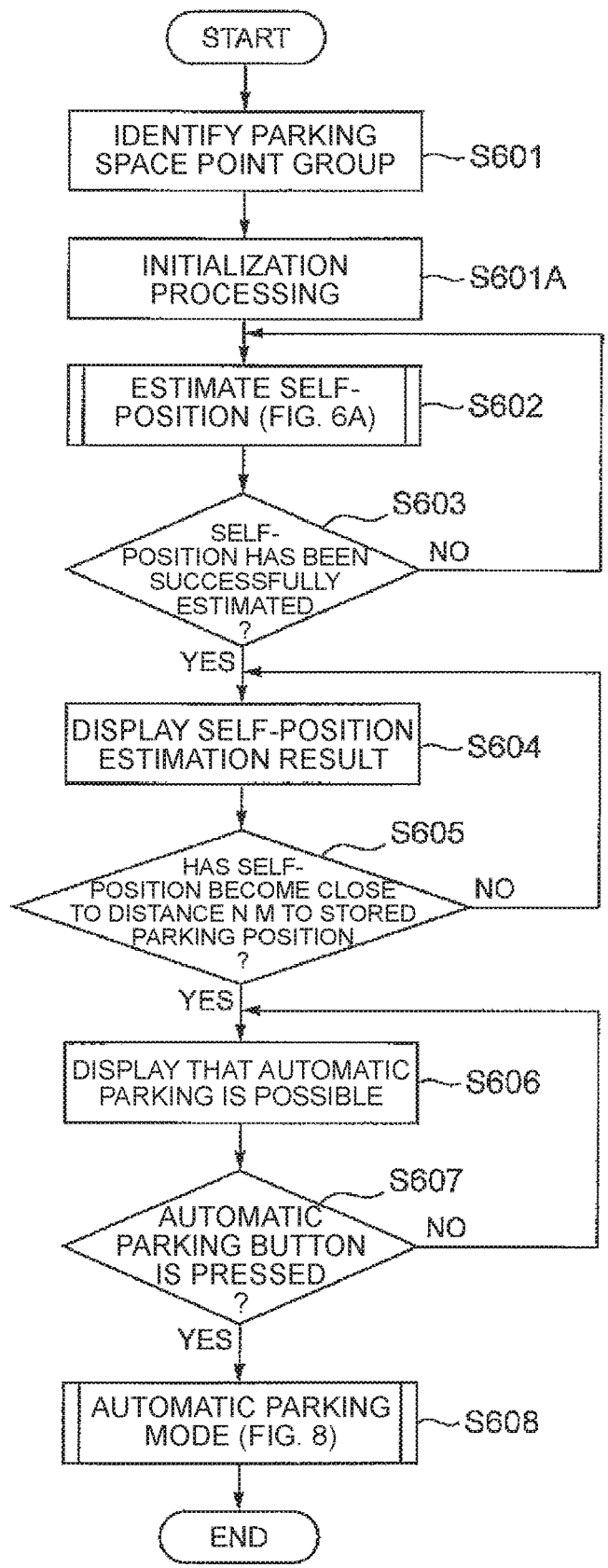
FIG. 5 is a flowchart illustrating operations of a position estimation mode of the in-vehicle processing apparatus 120.

FIG. 5 is a flowchart illustrating the operation of the position estimation mode of the in-vehicle processing apparatus 120. A subject which executes each step explained below is the arithmetic operation unit 121 for the in-vehicle processing apparatus 120.

The in-vehicle processing apparatus 120 identifies a point group having the latitude and longitude which are substantially identical to the current position of the vehicle 1 (a parking space point group) from among a plurality of pieces of parking space data included in the point group map 124A (step S601). Next, the in-vehicle processing apparatus 120 performs, as initialization processing, initialization of the local peripheral information 122B stored in the RAM 122 and initialization of the current position of the vehicle 1 saved in the RAM 122 (step S601A). Specifically speaking, if any prior information is recorded, the in-vehicle processing apparatus 120 deletes it and sets a new coordinate system. In this embodiment, this coordinate system will be referred to as the local coordinate system. This local coordinate system is set based on the position and attitude of the vehicle 1 when executing step S601A.

For example, the position of the vehicle 1 when executing step S601A is set as an origin of the local coordinate system and an X-axis and a Y-axis are set depending on the direction when executing step S601A. Furthermore, the current position of the vehicle 1 is initialized by setting the current position of the vehicle 1 as the origin (0, 0).

Figure 6A:
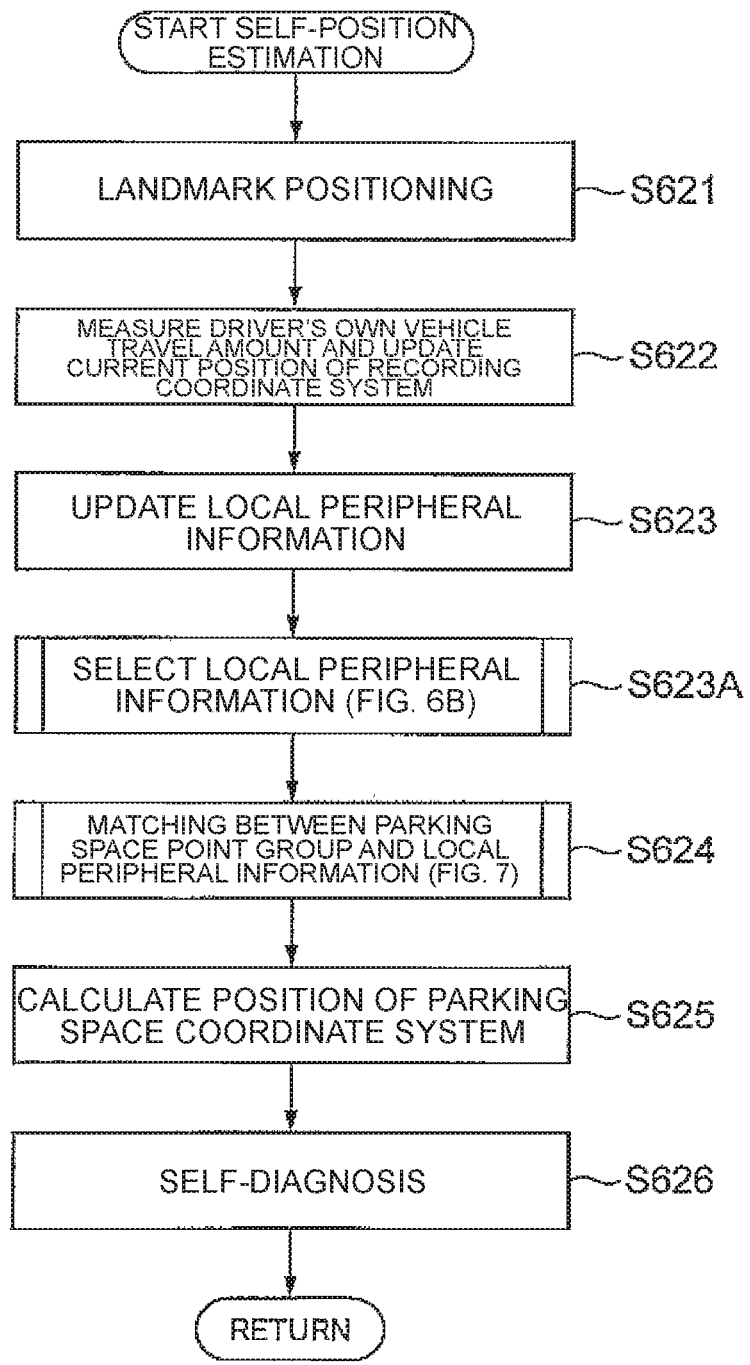
FIG. 6A is a flowchart illustrating operations of self-position estimation processing in an automatic parking phase.

Next, the arithmetic operation unit 121 estimates the self-position according to the procedures illustrated in FIG. 6A, that is, estimates the position of the vehicle 1 in the parking space coordinate system (step S602) and judges whether the self-position has been successfully estimated or not in step S603. If it is judged that the self-position has been successfully estimated, the processing proceeds to step S604; and if it is judged that the self-position has not been successfully estimated, the processing returns to step S602.

In step S604, the in-vehicle processing apparatus 120 displays the self-position estimation result on the map on the display device 111; and in the subsequent step S605, the in-vehicle processing apparatus 120 judges whether the self-position has entered an area within a specified range from the stored parking position or not. For example, when the vehicle 1 has approached within a distance of N m from the stored parking position, it is judged that the vehicle 1 has entered the area within the specified range. If it is judged that the vehicle 1 has entered the area within the specified range, the processing proceeds to step S606; and if it is judged that the vehicle 1 has not entered the area within the specified range, that is, the vehicle 1 is out of the range, the processing returns to step 604.

In step S606, the in-vehicle processing apparatus 120 displays on the display device 111 that the automatic parking is possible; and in the subsequent step S607, the in-vehicle processing apparatus 120 judges whether the automatic parking button 110B is pressed by the user or not. If it is judged that the automatic parking button 110B is pressed, the in-vehicle processing apparatus 120 proceeds to step S608 and makes the transition to the automatic parking mode, and executes automatic parking processing according to procedures illustrated in FIG. 8; and if it is judged that the automatic parking button 110B is not pressed, the in-vehicle processing apparatus 120 returns to step S606.

Referring to FIG. 6A, the details of the self-position estimation processing executed in step S602 in FIG. 5 will be explained. When executing the processing illustrated in steps S621 to S623 in FIG. 6A, the arithmetic operation unit 121 functions as a local peripheral information creation unit.

The landmark positioning in step S621, the estimation of the driver's own vehicle travel amount in step S622, and the update of the local peripheral information 122B in step S623 are respectively almost the same as the processing in steps S502 to S504 in FIG. 4. The difference is that the data stored in the RAM 122 is recorded as the local peripheral information 122B.

Figure 6B:
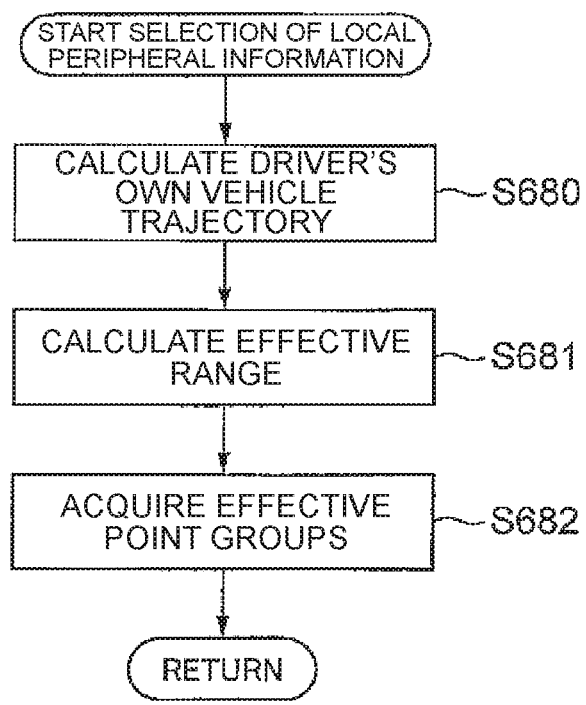
FIG. 6B is a flowchart illustrating operations of local peripheral information selection processing in the automatic parking phase.

When the execution of step S623 is completed, the in-vehicle processing apparatus 120 selects the local peripheral information, the details of which are illustrated in FIG. 6B (step S623A). This local peripheral information selection processing is processing for selecting points to be used for matching processing in step S624 described later from the point groups obtained as the local peripheral information. The entire shape of the point groups obtained as the local peripheral information may be different from that of the point group map due to accumulated errors of the estimation of the driver's own vehicle travel amount and cannot sometimes be used for matching. This local peripheral information selection processing is to adaptively select the point group(s) with a small shape error and within the range enabling matching.

Figure 7:
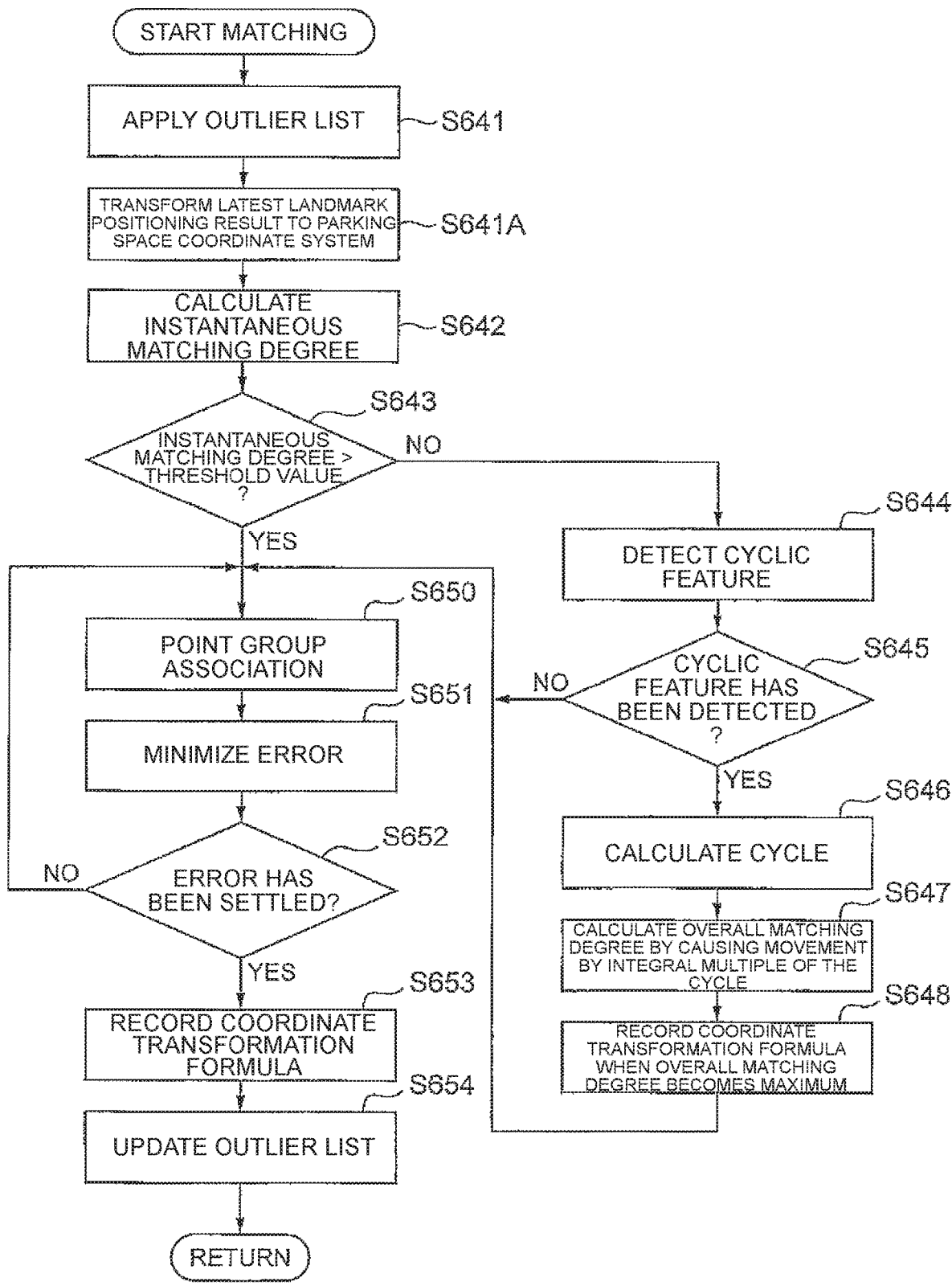
FIG. 7 is a flowchart illustrating matching processing in the automatic parking phase.

When the processing of step S624A is completed, the in-vehicle processing apparatus 120 executes the matching processing, the details of which are illustrated in FIG. 7 (step S624). Through this matching processing, the correspondence relationship between the parking space coordinate system and the local coordinate system, that is, a coordinate transformation formula between the parking space coordinate system and the local coordinate system is obtained. In the subsequent step S625, the in-vehicle processing apparatus 120 calculates the coordinates of the vehicle 1, that is, the self-position in the parking space coordinate system by using the coordinates of the vehicle 1 in the local coordinate system updated in step S622 and the coordinate transformation formula obtained in step S625. Next, the processing proceeds to step S626.

In step S626, the in-vehicle processing apparatus 120 executes self-diagnosis to judge reliability of the position calculated in step S625. The self-diagnosis is judged by, for example, using the following three indexes.

A first index is to: compare the travel amount of the vehicle 1 which is estimated by the known dead reckoning technology by using the outputs from the vehicle speed sensor 108 and the steering angle sensor 109 with the travel amount estimated by the self-position estimation during a specified period of time; and judge that the reliability is low if the difference between them is larger than a predetermined threshold value.

A second index is to make a judgment based on an error amount of the corresponding point(s) calculated at the time of matching. If the error amount is more than a predetermined threshold value, it is judged that the reliability is low.

A third index is to judge whether there is any similarity solution or not. When a similarity solution is searched for by, for example, causing translational movement for the distance equal to the width of a parking frame on the basis of the obtained solution and if there are approximately the same number of points having not more than a certain amount of corresponding point errors, it is judged that the reliability is low. If it is not judged by all these three indexes that the reliability is low, it is judged that the self-position has been successfully estimated.

Referring to FIG. 6B, the details of the local peripheral information selection processing executed in step S623A in FIG. 6A will be explained. When executing the processing illustrated in FIG. 6B, the arithmetic operation unit 121 functions as a local peripheral information selection unit.

In step S680, the arithmetic operation unit 121 calculates a trajectory of the driver's own vehicle to the current position by using the calculation of the travel amount of the driver's own vehicle which is implemented within step S622. The trajectory generated by interpolating coordinate points of the position of the driver's own vehicle calculated from the travel amount of the driver's own vehicle becomes the driver's own vehicle trajectory.

In step S681, the arithmetic operation unit 121 calculates an effective range which has a small shape error and enables matching, with respect to the point groups of the local peripheral information. This effective range is judged based on the length and shape of the driver's own vehicle trajectory calculated in step S680. Regarding the point groups obtained as the local peripheral information, when the distance is longer and a turning amount of the vehicle is larger, an error in the estimation of the travel amount tends to occur more easily. On the other hand, when the number of point groups is too small, it becomes difficult to perform the matching, So, the arithmetic operation unit 121 obtains point groups within a range tracking back a predetermined minimum distance D[m] from the current position along the trajectory. After that, the arithmetic operation unit 121 accumulates a change amount of a tangential line angle of the trajectory and obtains point groups around the trajectory until the change amount becomes equal to or more than a predetermined angle threshold value θ[deg]. The point groups within a predetermined range X[m]×Y[m] centered at the trajectory relative to the trajectory are defined as the effective range of the point groups of the local peripheral information. Specifically speaking, the effective range has the shape formed along the obtained trajectory.

In step S682, points within the effective range obtained in step S681 are obtained as the point groups of the local peripheral information.

Referring to FIG. 7, the details of the matching processing executed in step S624 in FIG. 6A will be explained. When executing the processing illustrated in FIG. 6A, the arithmetic operation unit 121 functions as the position estimation unit 121C.

In step S641, the arithmetic operation unit 121 applies the outlier list 122A stored in the RAM 122 to the local peripheral information 122B and causes the points which are recorded in the outlier list 122A, from among the point groups included the local peripheral information 122B, to be temporarily not subject to the processing. This application range is from step S642 to step S653 and in step S654, the points which were previously included in the outlier list 122A also become targets. However, when the flowchart illustrated in FIG. 7 is executed for the first time, steps S641 to S643 cannot be executed and, therefore, the processing starts to be executed from step S650. Next, the processing proceeds to step S641A.

In step S641A, the arithmetic operation unit 121 transforms the coordinates of the point group(s) detected from the latest captured image, that is, the point group(s) constituting the landmark(s) detected in step S621 in FIG. 6A to the coordinates of the parking space coordinate system. This transformation is realized by using a coordinate transformation formula from the position of the vehicle 1 in the local coordinate system, which was updated in step S622, and the local coordinate system which was calculated last time, to the parking space coordinate system.

In the subsequent step S642, an instantaneous matching degree IC is calculated. The instantaneous matching degree IC is calculated according to Expression 2 below.

$$IC = Dlin/Diall \qquad \text{Expression 2}$$

It should be noted that "Dlin" in Expression 2 represents the number of points, regarding which the distance to points constituting the closest point group map 124A is equal to or less than a predetermined threshold value, among the point groups detected from the latest captured image which was transformed to the parking space coordinate system in step S641A. Furthermore, "DIall" in Expression 2 represents the number of the point groups detected in step S621. Next, the processing proceeds to step S643.

In step S643, the arithmetic operation unit 121 judges whether the instantaneous matching degree IC calculated in step S642 is more than a threshold value or not. If it is judged that the instantaneous matching degree IC is more than the threshold value, the processing proceeds to step S650; and if it is judged that the instantaneous matching degree IC is equal to or less than the threshold value, the processing proceeds to step S644.

In step S644, the arithmetic operation unit 121 detects cyclic features, for example, a plurality of aligned parking frames from the parking space data which is the target of the point group map 124A, that is, the point group data, Since the point groups included in the point group map can be obtained by extracting, for example, edges in the image as described earlier, parking frame lines can be detected from points aligned with the distance, which corresponds to the width of the white line, between them. In the subsequent step S645, the arithmetic operation unit 121 judges whether the cyclic feature was detected in step S644 or not; and if it is judged that the cyclic feature was detected, the processing proceeds to step S646; and if it is judged that the cyclic feature was not detected, the processing proceeds to step S650. In step S646, the arithmetic operation unit 121 calculates a cycle of the cyclic feature, for example, the width of the parking frame. The width of the parking frame herein used means the distance between the white lines constituting the parking frame. Next, the processing proceeds to step S647.

In step S647, the arithmetic operation unit 121 calculates an overall matching degree IW on the basis of the coordinate transformation formula calculated in step s653 last time by changing this coordinate transformation formula in a plurality of manners.

The coordinate transformation formula is changed in a plurality of manners so that the point group map is moved by an integral multiple of the detected cyclic feature. The overall matching degree IW is calculated according to Expression 3 below.

$$IW=DWin/DWall \qquad \text{Expression 3}$$

It should be noted that "DWin" in Expression 3 represents the number of points, regarding which the distance to the points constituting the closest point group map 124A is equal to or less than a predetermined threshold value, from among the points regarding which the points constituting the local peripheral information 122B are transformed to the parking space coordinate system by using the aforementioned coordinate transformation formula. Furthermore, "DWall" in Expression 3 represents the number of the points detected in step S621. Next, the processing proceeds to step S648.

In step S648, the arithmetic operation unit 121 stores the coordinate transformation formula which provides the maximum overall matching degree IW, from among a plurality of overall matching degrees IW calculated in step S647, in the RAM 122 and proceeds to step S650.

The ICP (Iterative Closest Point) algorithm which is the already-known point group matching technology can be used for association processing in step S650, error minimization processing in step S651, and settlement judgment processing in step S625. However, setting of an initial value in step S650 is specific to this embodiment, so that it will be explained in detail and only the outlines of other processing will be explained.

In S650 executed when the affirmative judgment is obtained in step S643, when the negative judgment is obtained in step S645, when the execution of step S648 is terminated, or when the negative judgment is obtained in step S652, association between the point groups included in the parking space data of the point group map 124A and the point groups included in the local peripheral information 122B is calculated. If it is executed next to step S643 or step S648, the values which are coordinate-transformed by using the coordinate transformation formula recorded in the RAM 122 are used for the point group data of the local peripheral information 122B.

Specifically speaking, when step S650 is executed as a result of the affirmative judgment in step S643, the coordinate transformation formula calculated in step S653 which was executed last time is used. On the other hand, when step S650 is executed next to step S648, the coordinate transformation formula which was stored in step S648 is used. Next, the processing proceeds to step S651.

In step S651, the coordinate transformation formula is changed to minimize an error of the corresponding points. For example, the coordinate transformation formula is changed so that a sum of the indexes of the distances between the points associated in step S650 becomes minimum. A sum of absolute values of the distances can be adopted as the sum of the indexes of the distances between the associated points. In the subsequent step S652, the arithmetic operation unit 121 judges whether the error has been settled or not; and if it is judged that the error has been settled, the processing proceeds to step S653; and if it is judged that the error has not been settled, the processing returns to step S650. In the subsequent step S653, the arithmetic operation unit 121 lastly saves the coordinate transformation formula, which was changed in step S651, in the RAM 122 and proceeds to step S654.

In step S654, the arithmetic operation unit 121 updates the outlier list 122A as described below. Firstly, the arithmetic operation unit 121 clears the existing outlier list 122A stored in the RAM 122. Next, the arithmetic operation unit 121 transforms the point groups of the local peripheral information 122B to the parking space coordinate system by using the coordinate transformation formula recorded in step 653 and calculates the distance between the points constituting the local peripheral information 122B and their corresponding points constituting the point group map 124A, that is, the Euclidean distance. Then, if the calculated distance is longer than a predetermined distance, the arithmetic operation unit 121 adds the relevant point of the local peripheral information 122B to the outlier list 122A. However, under this circumstance, positioning at an edge spatially may be a further condition to be added to the outlier list 122A. The spatial edge means a point having a far distance to other points, such as a point which is obtained when recording is started. As a result of the above-described processing, the outlier list 122A is updated. Then, the flowchart in FIG. 7 is terminated.

(Flowchart of Automatic Parking Mode 204)

Figure 8:
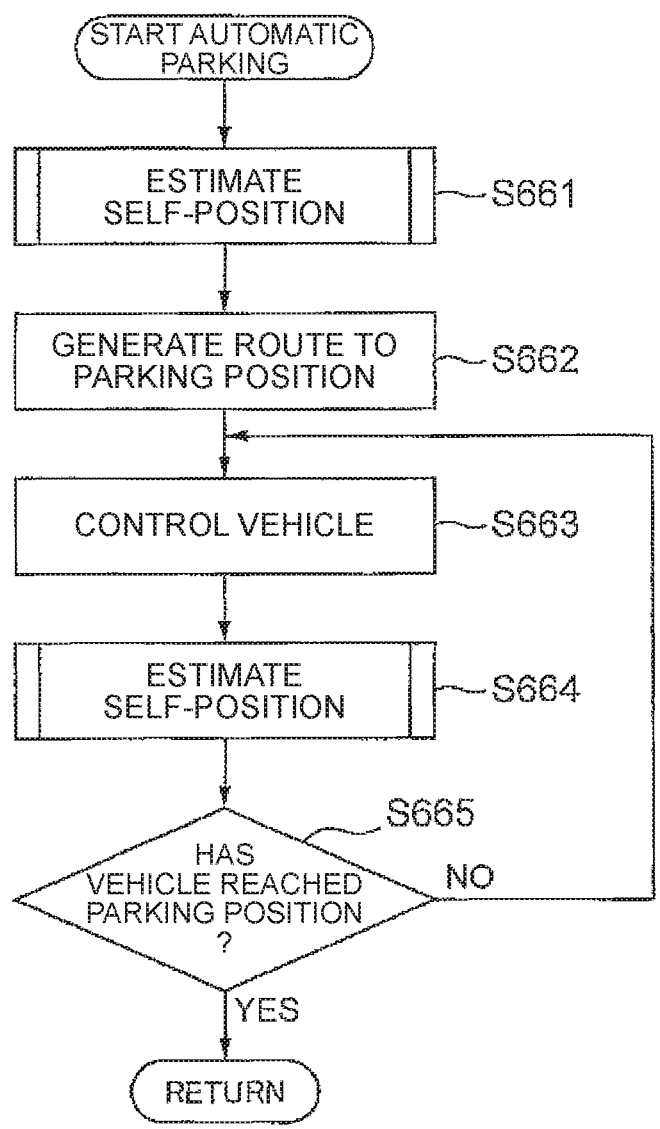
FIG. 8 is a flowchart illustrating automatic parking processing in the automatic parking phase.

Referring to FIG. 8, the details of the processing of the automatic parking mode 204 executed in step S608 in FIG. 5 will be explained. A subject which executes each step explained below is the in-vehicle processing apparatus 120.

When the position of the driver's own vehicle has been successfully estimated and the self-position is located within a specified range from the parking position and only while the user is pressing the automatic parking button 110B, the transition is made from the self-position estimation mode 203 to the automatic parking mode 204. Specifically speaking, the automatic control is performed with the user's approval.

In step S661, the in-vehicle processing apparatus 120 estimates the position of the vehicle 1 in the parking space coordinate system. Since the processing of this step is similar to that of step S604 in FIG. 5, an explanation about it has been omitted. In the subsequent step S662, the in-vehicle processing apparatus 120 generates a traveling route from the position estimated in step S661 to the parking position stored in the point group map 124A by an already-known route generation method. Next, the processing proceeds to step S663.

In step S663, the in-vehicle processing apparatus 120 controls the steering device 131, the driving device 132, and the braking device 133 via the vehicle control apparatus 130 and moves the vehicle 1 to the parking position along the route generated in step S662. Only when the automatic parking button 110E continues to be pressed by the user, the in-vehicle processing apparatus 120 outputs operating commands to the driving device 132. Furthermore, when humans and moving vehicles are extracted from the image(s) captured by the camera 102, the sonar 103, and the radar 104, the in-vehicle processing apparatus 120 activates the braking device 133 and stops the vehicle 1. In the subsequent step S664, the in-vehicle processing apparatus 120 estimates the position of the vehicle 1 in the same manner as in step S661. In the subsequent step S665, the in-vehicle processing apparatus 120 judges whether parking has been completed or not, that is, whether the vehicle 1 has reached the parking position or not; and if it is judged that parking has not been completed, the processing returns to step S663; and if it is judged that parking has been completed, the in-vehicle processing apparatus 120 terminates the flowchart in FIG. 8.
(Operation Examples)

Referring to FIG. 9 to FIG. 14, specific operations of the map storage mode 202, the position estimation mode 203, and the automatic parking mode 204 will be explained.

FIG. 9A is a plane view illustrating an example of a parking space 901. The parking space 901 is provided around a building 902. There is only one entrance/exit for the parking space 901 at the lower left side in the drawing. A quadrangular shape in FIG. 9A represents a parking frame which is road surface paint; and a parking frame 903 indicated with hatching is a parking area (the area which becomes the parking position when parking is completed) for the vehicle 1. In this operation example, an explanation will be provided by indicating that landmarks are only parking frame lines. In this operation example, the vehicle 1 is expressed as an triangle as illustrated in FIG. 9A and an acute angle of the triangle indicates the traveling direction of the vehicle 1.
(Operation Example: Map Storage Mode 202 (1))

When the transition is made from the normal traveling mode 201 to the map storage mode 202 near the entrance of the parking space 901, the in-vehicle processing apparatus 120 starts landmark positioning and records the coordinates of points constituting the parking frame lines (step S501 in FIG. 4: YES, S502 to S504). Then, the vehicle 1 repeats the processing in steps S502 to S504 in FIG. 4 until the answering button 110A is pressed and the storage processing is approved.

FIG. 9B is a diagram in which point groups of landmarks saved in the RAM 122 are visualized.

Regarding FIG. 9B, solid lines represents the point groups of the landmarks saved in the RAM 122 and broken lines represents landmarks which are not saved in the RAM 122. The sensible range of the camera 102, the sonar 103, and the radar 104 is limited, so that when the vehicle 1 is located near the entrance of the parking space 901, only the parking frame lines near the entrance of the parking space 901 are recorded. When the user moves the vehicle 1 to further inside of the parking space 901, the in-vehicle processing apparatus 120 can record the point groups of all the landmarks of the parking space 901.

When the user stops the vehicle 1 in the parking frame 903 and presses the answering button 110A as a recording completion button, the in-vehicle processing apparatus 120 acquires the latitude and longitude of the vehicle 1 from the car navigation system 107 and records the coordinates of the four corners of the vehicle 1 (step S505: YES, S505A). When the latitude and longitude which are substantially identical to the current latitude and longitude of the vehicle 1 are not recorded in the point group map 124A (step S506: NO), the point groups saved in the RAM 122 are recorded as new data which configures the point group map 124A, that is, new parking space data (step S510).
(Operation Example: Map Storage Mode 202 (2))

Figure 10A:
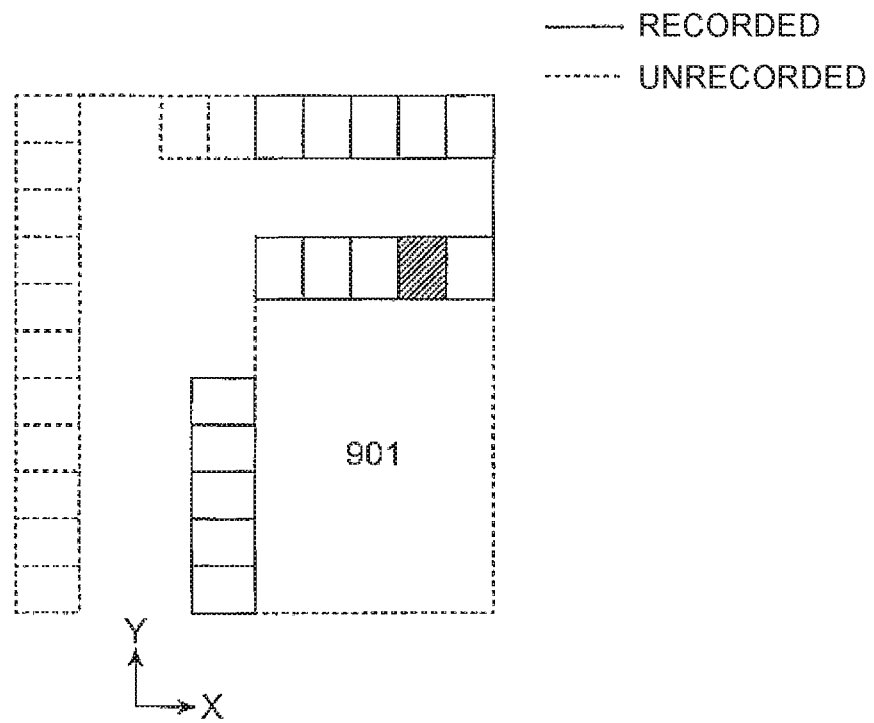
FIG. 10A is a diagram illustrating an example where point group data of the point group map 124A is visualized.
Figure 10B:
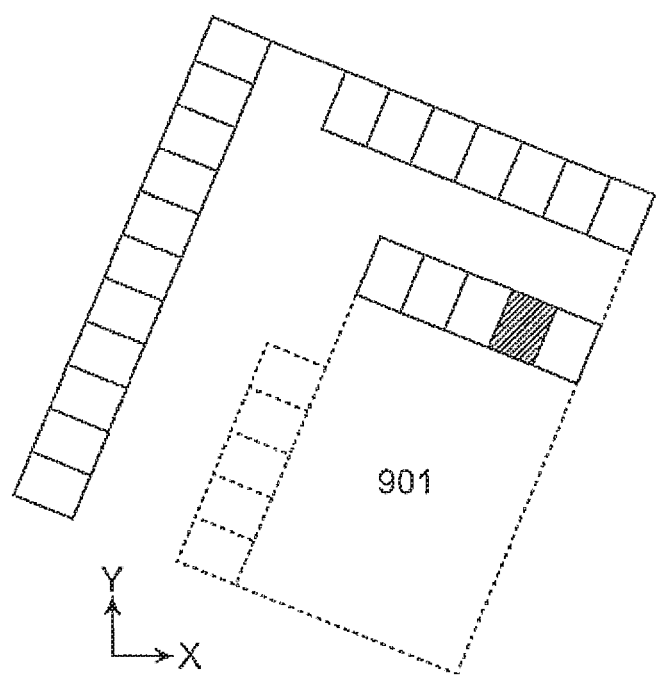
FIG. 10B is a diagram illustrating an example where newly detected point group data is visualized.

As another example, an explanation will be provided about a case where point group data illustrated in FIG. 10A is recorded as the parking space data of the point group map 124A and point group data illustrated in FIG. 10B is newly obtained. The point group data illustrated in FIG. 10A is, for example, point group data obtained when the vehicle ran closer to and along the right side from the entrance of the parking space 901 illustrated in FIG. 9A and reached the parking position. Since the vehicle 1 ran more closer to and along the right side as compared to FIG. 9A, point group data of parking frames indicated with the broken lines in FIG. 10A are not obtained.

The point group data illustrated in FIG. 10B is, for example, point group data obtained when the vehicle ran closer to and along the left side from the entrance of the parking space 901 and reached the parking position. Since the vehicle 1 ran more closer to and along the left side as compared to FIG. 9A, point group data of parking frames indicated with the broken lines in FIG. 10B are not obtained. Furthermore, the point group data illustrated in FIG. 10B is recorded as if the parking space 901 were inclined as compared to FIG. 10A because the vehicle 1 was not facing directly opposite the parking space 901 when the transition was made to the storage mode.

When the user approves the storage with the answering button 110A under the above-described circumstance and it is judged that the latitude and longitude which are substantially identical to the current latitude and longitude of the vehicle 1 are recorded in the point group map 124A (S506: YES), the coordinate transformation is performed on the basis of the parking position in FIG. 10A and FIG. 10B, that is, the parking frame 903 (step S507). Then, the in-vehicle processing apparatus 120 calculates the point group matching rate IB (step S507A); and if it is judged that the point group matching rate IB is higher than a specified threshold value (step S508: YES), the point group data illustrated in FIG. 10B is integrated with the point group data illustrated in FIG. 10A by the merge processing (step S509). As a result of this integration, the point groups of the parking frame lines on the left side of FIG. 10A, which are not recorded in FIG. 10A, are newly recorded and the density of point groups constituting the parking frame lines on the right side and the upper part of the drawing, which have already been recorded, becomes high.
(Operation Example: Execution Phase (1)=Self-Position Estimation Mode 203+Automatic Parking Mode 204)

An operation example of the matching processing in an execution phase will be explained. In this operation example, the point group data corresponding to the entire parking space 901 illustrated in FIG. 9A is stored in the point group map 124A in advance.

Figure 11:
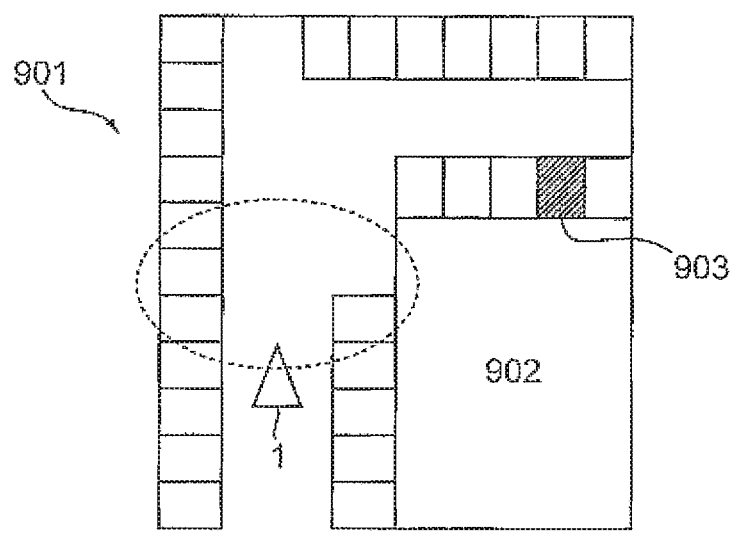
FIG. 11 is a diagram illustrating a current position of a vehicle 1 in the parking space 901.
Figure 12:
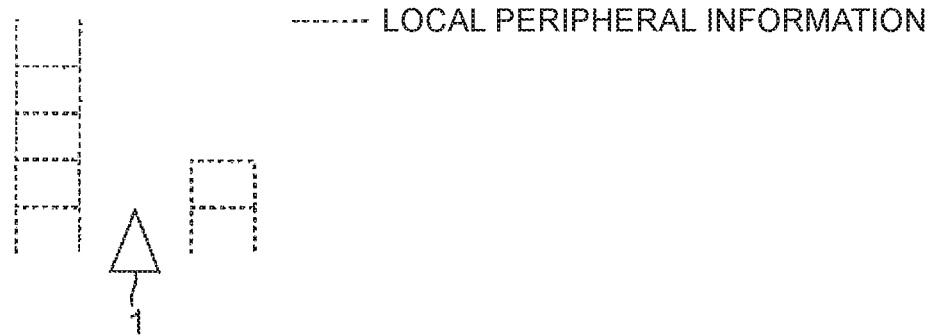
FIG. 12 is a diagram illustrating data obtained by transforming point groups, which are extracted by a sensor group at the position of the vehicle 1 indicated in FIG. 11, to parking space coordinates.
Figure 13:
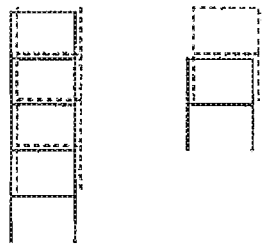
FIG. 13 is a diagram illustrating a comparison between the point group map 124A and local peripheral information 122E indicated in FIG. 11 when an estimation of the position of the vehicle 1 in a parking space coordinate system includes an error.

FIG. 11 is a diagram illustrating the current position of the vehicle in the parking space 901 illustrated in FIG. 9A. The vehicle 1 faces upwards in the drawing. FIG. 12 and FIG. 13 show the parking frame lines in a portion surrounded by a broken-line circle in FIG. 11, which is an area ahead of the vehicle 1.

FIG. 12 is a diagram illustrating data obtained by transforming the point groups, which are sensed by the sensor group and extracted at the position of the vehicle 1 illustrated in FIG. 11, to the parking space coordinates. Specifically speaking, the point groups illustrated in FIG. 12 are the point groups which are detected from the latest captured image and are the data processed in step S641A in FIG. 7 from among the local peripheral information 122B. However, FIG. 12 is illustrated by using the broken lines, but not points. Furthermore, FIG. 12 also displays the vehicle 1 for the comparison with FIG. 11. As illustrated in FIG. 12, the point group data of the parking frame lines exist seamlessly on the left side of the vehicle 1 and the point group data of the parking frame lines exist only in an area close to the vehicle 1 on the right side the vehicle 1.

FIG. 13 is a diagram illustrating a comparison between the point group map 124A and the local peripheral information 122B illustrated in FIG. 11 when the estimation of the position of the vehicle 1 in the parking space coordinate system includes an error. Regarding FIG. 13, the previous position estimation was misaligned by an amount of approximately one width of the parking frame, so that the local peripheral information 122B existing on the right side of the vehicle 1 is misaligned with the point group map 124A. When the instantaneous matching degree IC is calculated in the above-described circumstances (step S642 in FIG. 7), the instantaneous matching degree IC becomes a low value due to the aforementioned misalignment on the right side of the vehicle 1. If it is judged that this value is lower than the threshold value (step S643: NO), the parking frames are detected as a cyclic feature (step S644, S645: YES), the width (cycle) of the parking frame is calculated from the point group map 124A (step S646), the local peripheral information 122B is moved by an integral multiple of the width of the parking frame, and the overall matching degree IW is thereby calculated (step S647).

Figure 14A:
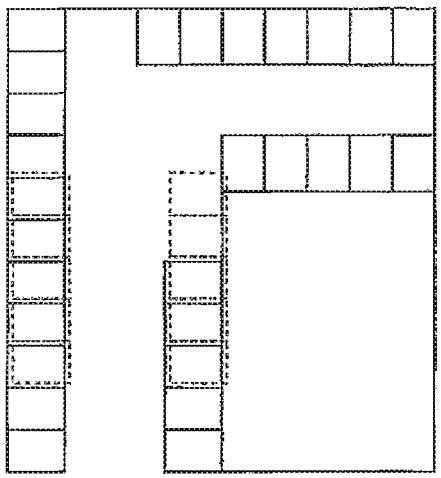
FIG. 14A to FIG. 14C are diagrams illustrating the relationships with the point group map 124A when the local peripheral information 122B indicated in FIG. 13 is moved by an integral multiple of the width of a parking frame.
Figure 14B:
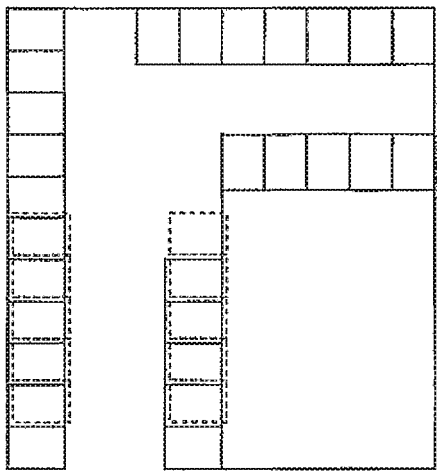
Figure 14C:
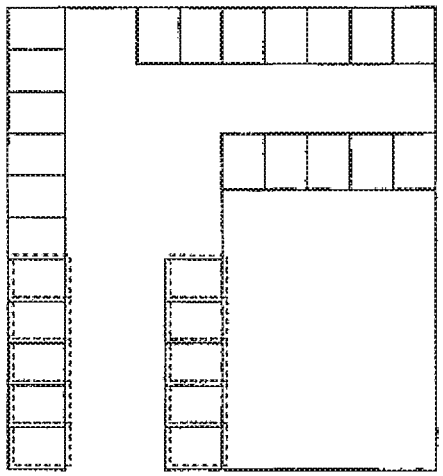

FIG. 14A to FIG. 14C are diagrams illustrating the relationship with the point group map 124A when the local peripheral information 122B illustrated in FIG. 13 is moved by the integral multiple of the width of the parking frame. In FIG. 14A to FIG. 14C, the local peripheral information 122B illustrated in FIG. 14 is moved upwards in the drawing by +1 times, 0 times, and −1 times the width of the parking frame, respectively. In FIG. 14A, the local peripheral information 122B has been moved upwards in the drawing by one width of the parking frame and the misalignment between the local peripheral information 122B and the point group map 124A has increased. Therefore, the overall matching degree IW in FIG. 14A becomes smaller than the case where the local peripheral information 122B is not moved. In FIG. 14B, the local peripheral information 122B has not been moved and the local peripheral information 122B is misaligned from the point group map 124A by one width of the parking frame as illustrated in FIG. 13. In FIG. 14C, the local peripheral information 122B has been moved downwards in the drawing by one width of the parking frame, so that the local peripheral information 122B is substantially identical to the point group map 124A. Therefore, the overall matching degree IW in FIG. 14C becomes larger than the case where the local peripheral information 122B is not moved.

The movement amount of the local peripheral information 122B and the increase/decrease of the overall matching degree IW have the relationship as described above; and, therefore, in the examples illustrated in FIG. 14, the overall matching degree IW corresponding to FIG. 14C is judged to be the maximum and the coordinate transformation formula corresponding to this movement is recorded in the RAM 122 (step S648). In this way, the in-vehicle processing apparatus 120 enhances the precision of the estimated position.

(Operation Example: Execution Phase (2)=Self-Position Estimation Mode 203+Automatic Parking Mode 204)

FIG. 15 shows a comparison between the point group map 124A and the local peripheral information 122E illustrated in FIG. 11 when the estimation of the position of the vehicle 1 in the parking space coordinate system includes an error.

Figure 15A:
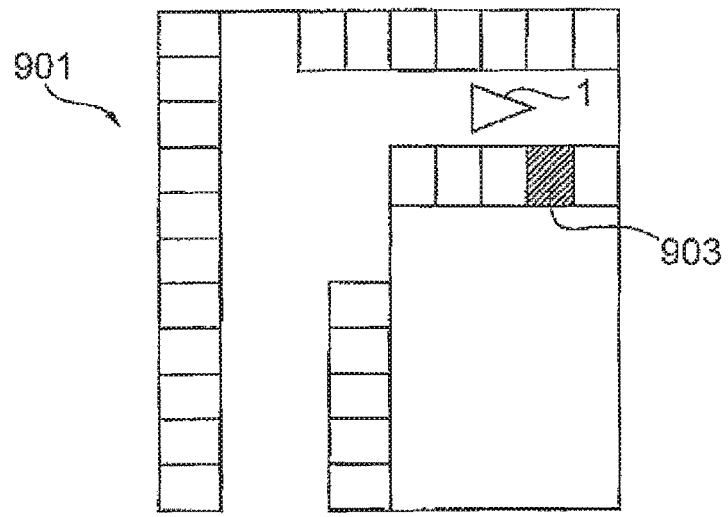
FIG. 15A to FIG. 15C are diagrams explaining a matching method when an error occurs when turning.
Figure 15B:
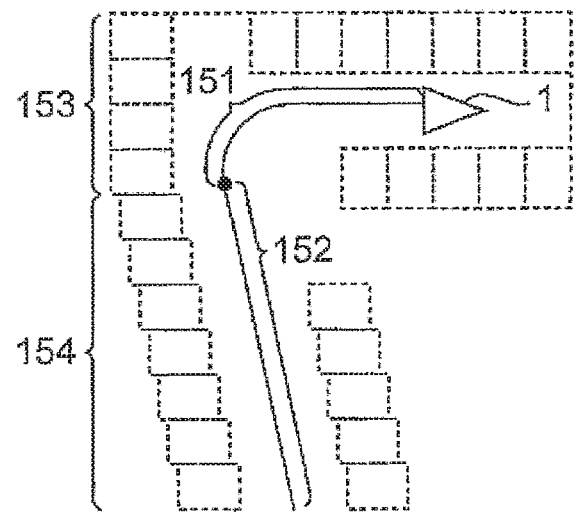
Figure 15C:
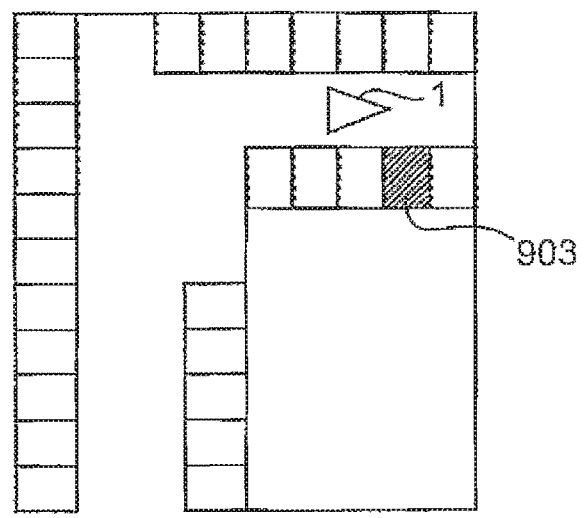

FIG. 15A is a diagram illustrating the current position of the vehicle 1 in the parking space 901 illustrated in FIG. 9A. The vehicle 1 is facing towards the right side of the drawing. FIG. 15B is a diagram illustrating data obtained by transforming point groups extracted from images, which have been captured until the vehicle 1 reaches the position illustrated in FIG. 15A, to the parking space coordinates. A traveling trajectory has an effective portion 151 and an ineffective portion 152 and the point groups of the local peripheral information are divided into an effective range 153 and an ineffective range 154, FIG. 15C shows the result of matching performed by using the point groups within the effective range 153.

In the example illustrated in FIG. 15B, an error occurred when the vehicle 1 turned to the right; and the shape of the point groups has changed as a whole. Therefore, it can be surmised that even if the matching between the local peripheral information 122B illustrated in FIG. 15A and the parking space point groups is performed as a whole as they are, they do not match each other.

In this embodiment, the point groups within a specified range centered at the effective portion 151 of the driver's own vehicle trajectory are defined, by the processing of step S681 in FIG. 6B, as the effective range 153 of the point groups of the local peripheral information. The effective portion 151 of the traveling trajectory extends from the self-position back to the opposite direction of the traveling trajectory and ends at a big turn portion. Points within a specified range (points within the effective range) centered at the effective portion 151 of the traveling trajectory are obtained as the point groups of the local peripheral information and are used for the matching. Points within a specified range (points within the ineffective range 154) centered at the ineffective portion 152 of the traveling trajectory are not used for the matching. Therefore, the right matching can be performed.

According to the above-described first embodiment, the following operational advantages can be obtained.

(1) The in-vehicle processing apparatus 120 includes: the storage unit 124 which stores the point group data (the point group map 124A) including a plurality of coordinates of points representing a part of an object in the first coordinate system (the parking space coordinate system); the sensor input unit (the interface 125) which acquires outputs of the camera 102 which acquires information of the surroundings of the vehicle 1; the movement information acquisition unit (the interface 125) which acquires information about movements of the vehicle 1; the local peripheral information creation unit which generates the local peripheral information 122B including the position of the vehicle in the second coordinate system (the local coordinate system) and a plurality of coordinates of points representing a part of the object in the second coordinate system (the local coordinate system) on the basis of the information acquired by the sensor input unit and the movement information acquisition unit; and the position estimation unit 121C which estimates the relationship between the first coordinate system and the second coordinate system based on the point group map 124A and the local peripheral information 122B and estimates the position of the vehicle 1 in the first coordinate system.

The in-vehicle processing apparatus 120 estimates the coordinate transformation formula between the parking space coordinate system and the local coordinate system on the basis of the point group map 124A and the local peripheral information 122B and estimates the position of the vehicle 1 in the parking space coordinate system. The point group map 124A is information stored in the storage unit 124 in advance and the local peripheral information 122B is generated from the outputs from the camera 102, the vehicle speed sensor 108, and the steering angle sensor 109.

Specifically speaking, the in-vehicle processing apparatus 120 can acquire information of point groups of a coordinate system different from the coordinate system of the recorded point groups and estimate the position of the vehicle 1 in the recorded coordinate system on the basis of the correspondence relationship between the different coordinate systems. Furthermore, the in-vehicle processing apparatus 120 estimates the coordinate transformation formula between the parking space coordinate system and the local coordinate system on the basis of the point group map 124A and the local peripheral information 122B, so that even if part of the point group data of the local peripheral information 122B includes noise, the in-vehicle processing apparatus 120 may hardly be affected by the noise, Specifically speaking, the estimation of the position of the vehicle 1 by the in-vehicle processing apparatus 120 has resistance to disturbances.

(2) The position estimation unit 121C searches the point group data for points corresponding to the respective points constituting the local peripheral information 122B (step S650 in FIG. 7) and estimates the coordinate transformation formula between the first coordinate system and the second coordinate system so that the distance between the corresponding points becomes minimum (step S651 in FIG. 7).

(3) The position estimation unit 121C performs the search and estimation by excluding point data of the local peripheral information regarding which the distance between the points constituting the point group data or the local peripheral information 122B and their corresponding points is farther than a predetermined threshold value, that is, by applying the outlier list 122A (steps S641 and S653 in FIG. 7), Accordingly, the point group data with the far distance, which can be considered as noise components, are excluded from calculation targets, thereby making it possible to enhance the precision of the coordinate transformation formula.

(4) The points included in the point group data and the local peripheral information are expressed as the coordinates in a two-dimensional space. The position estimation unit 121C performs the search and the estimation by excluding the points regarding which the distance between the corresponding points is farther than a predetermined threshold value, and by excluding the points positioned at spatially edges in the local peripheral information 122B.

The point groups stored in the parking space data of the point group map 124A relate to landmarks closer to the parking position than the spot where the user pressed the recording start button 110A. If the operation of the flowchart illustrated in FIG. 5 is started at a spot farther than the above-mentioned spot from the parking area, points which do not correspond to any of the points stored the parking space data are included in the local peripheral information 122B. If the ICP, that is, the processing in steps S650 to S652 in FIG. 7 is performed by including the above-described points, an appropriate solution cannot be obtained. So, these points are excluded to obtain the appropriate solution.

(5) The point group data includes the cyclic feature. After estimating the coordinate transformation formula between the first coordinate system and the second coordinate system, the position estimation unit 121C corrects the coordinate transformation formula between the first coordinate system and the second coordinate system on the basis of the distance corresponding to one cycle of the cyclic feature so that the distance between the corresponding points becomes shorter (steps S646 to S648 in FIG. 7).

Generally, when the point group data includes the cyclic feature, there is a tendency to easily cause the misalignment by an integral multiple of the distance corresponding to the cycle and perform the matching. Once such misalignment is caused and the matching is performed, it is difficult to match the data at a right portion due to the property of the repetitive processing. Therefore, this problem is solved by moving the position by the integral multiple of the cycle after the solution of the repetitive processing is settled. In other words, in consideration of the possibility of falling into a localized solution with misalignment by several cycles of the cyclic feature from a global solution as a result of repetitive calculation, the global solution or a localized solution which is much closer to the global solution can be obtained by moving the position by several cycles of the above-described cycle.

(6) When the instantaneous matching degree IC that is the index indicating the matching degree between the local peripheral information in the first coordinate system, which is created based on the previously estimated position of the vehicle in the first coordinate system, the latest information acquired by the sensor input unit, and the latest information acquired by the movement information acquisition unit, and the point group data in the first coordinate system is less than the predetermined threshold value, the position estimation unit performs the correction (step S641A to step S643 in FIG. 7), Therefore, the processing in steps S644 to S648 in FIG. 7 is not always executed, but the necessity of the processing is examined and the above processing is executed only when it is judged to be necessary to do so.

(7) The in-vehicle processing apparatus 120 includes the point group acquisition unit 121A which creates the second point group data including a plurality of coordinates of points representing a part of an object(s) excluding a mobile object(s) in the third coordinate system (the recording coordinate system) on the basis of the information acquired by the sensor input unit and the movement information acquisition unit and stores the created second point group data as the point group map 124A in the storage unit 124. Therefore, the in-vehicle processing apparatus 120 can create the point group map 124A when the vehicle 1 equipped with the in-vehicle processing apparatus 120 is running. The processing for creating the point group map 124A and the processing for estimating the position of the vehicle 1 have the landmark positioning in common with each other and can share and use the same program module.

(8) The third coordinate system (the recording coordinate system) is set based on the position and attitude of the vehicle when the creation of the second point group data is started. When a plurality of pieces of second point group data of different coordinate systems are obtained because the position or attitude of the vehicle upon the start of the creation of the second point group data varies, the point group acquisition unit 121A estimates the relationship between the different coordinate systems on the basis of the parking position of the vehicle 1 and integrates the plurality of pieces of the second point group data together (steps S507 and S509 in FIG. 4). Therefore, even if a different recording coordinate system is set every time the point group data is acquired, the plurality of pieces of the point group data can be integrated together. Although the position where the acquisition of the point group data is started, and the attitude of the vehicle 1 at that time vary, the attention is focused on the fact that the vehicle 1 is parked at the same parking position.

(9) The in-vehicle processing apparatus 120 includes: the vehicle control apparatus 130 which activates the vehicle based on the output from the position estimation unit 121C and moves the vehicle to a previously designated parking position in the first coordinate system; and the positional information acquisition unit (the interface 125) which acquires the latitude and longitude of the vehicle 1 from the car navigation system 107 which receives the information (the latitude and the longitude) about the position of the vehicle 1. Points constituting the point group map 124A are points representing a part of a structure(s) in the parking space. The storage unit 124 also stores the latitude and longitude of the parking space composed of stationary objects of the point group data. The in-vehicle processing apparatus 120 includes the control unit, that is, the arithmetic operation unit 121 which moves the vehicle 1 to the parking position by using the vehicle control apparatus 130 when the difference in the distance between the position measured by the car navigation system 107 and the position of the parking space is shorter than a predetermined distance. Therefore, the in-vehicle processing apparatus 120 can automatically park the vehicle 1 at the parking position included in the point group map 124A by setting a far location, from which any of the sensors mounted in the vehicle 1 cannot directly observe the parking position, as a start spot.

(10) The in-vehicle processing apparatus 120 includes the car navigation system 107 and a sensor group, that is, the camera 102, the sonar 103, and the radar 104 for sensing point groups of the surroundings; and the map generation unit 121B generates the point group map 124A in a data format which links the point groups to the latitude-longitude information as illustrated in FIG. 2. Whether the point groups of the surroundings exist or not and the relationship with the road map can be judged by referring to the latitude-longitude information and the transition can be automatically made to the storage mode or the position estimation mode. Therefore, it is no longer necessary for the user to perform the operation for the mode transition and the transition can be made smoothly to the storage or the automatic parking while driving.

The aforementioned first embodiment may be varied as described below.

(1) The in-vehicle processing apparatus 120 may be coupled to a plurality of cameras. The in-vehicle processing apparatus 120 can extract point groups from landmarks within a wide range existing around the vehicle 1 by using images captured by the plurality of cameras.

(2) The in-vehicle processing apparatus 120 may not receive the sensing results from the vehicle speed sensor 108 and the steering angle sensor 109. In this case, the in-vehicle processing apparatus 120 estimates the movements of the vehicle 1 by using the images captured by the camera 102. The in-vehicle processing apparatus 120 calculates the positional relationship between the object and the camera 102 by using the internal parameters and the external parameters which are stored in the ROM 123. Then, the travel amount and the movement direction of the vehicle 1 are estimated by tracking the relevant object in the plurality of captured images.

(3) The point group information such as the point group map 124A and the local peripheral information 122B may be stored as three-dimensional information. The three-dimensional point group information may be compared with other point groups in the two dimensions in the same manner as in the first embodiment by projecting them on the two-dimensional plane or they may be compared with each other both in three dimensions. In this case, the in-vehicle processing apparatus 120 can obtain a three-dimensional point group(s) of a landmark(s) as follows. Specifically speaking, the three-dimensional point group(s) of the stationary three-dimensional object(s) can be obtained by using the travel amount of the vehicle 1 calculated based on the outputs from the vehicle speed sensor 108 and the steering angle sensor 109 and the plurality of captured images which are output from the camera 102, and by using the known motion stereo technology and information regarding which its motion estimated portion is corrected by an internal sensor and a positioning sensor.

(4) In step S643 in FIG. 7, the in-vehicle processing apparatus 120 may proceed to step S644 when the negative judgment is obtained several times consecutively, instead of proceeding to step S644 as a result of only one negative judgment.

(5) Instead of the judgment in step S643 in FIG. 7, the in-vehicle processing apparatus 120 may judge whether a proportion of points which are determined as outliers in the local peripheral information 122B is higher than a predetermined threshold value or not. If that proportion is higher than the threshold value, the processing proceeds to step S644; and if that proportion is equal to or lower than the threshold value, the processing proceeds to step S650. Furthermore, the in-vehicle processing apparatus 120 may proceed to step S644 only when the above-described proportion is high in addition to the judgment in step S643 in FIG. 7.

(6) The in-vehicle processing apparatus 120 may execute the processing in steps S644 and S646 in FIG. 7 in advance. Furthermore, the processing results may be recorded in the storage unit 124.

(7) The in-vehicle processing apparatus 120 may receive the operating commands from the user not only from the input device 110 provided inside the vehicle 1, but also from the communication device 114. For example, as a mobile terminal carried by the user and the communication device 114 communicate with each other and the user operates the mobile terminal, the in-vehicle processing apparatus 120 may perform the operation in a manner similar to the case where the automatic parking button 110B is pressed. In this case, the in-vehicle processing apparatus 120 can perform the automatic parking not only when the user is inside the vehicle 1, but also even after the user gets off the vehicle.

(8) The in-vehicle processing apparatus 120 may park the vehicle not only at the parking position recorded in the point group map 124A, but also at a position designated by the user. The designation of the parking position by the user is performed, for example, by the in-vehicle processing apparatus 120 displaying parking position candidates on the display device 111 and by the user selecting any one of the parking position candidates via the input device 110.

(9) The in-vehicle processing apparatus 120 may receive the point group map 124A from outside via the communication device 114 or send the created point group map 124A to the outside via the communication device 114. Furthermore, a receiver/sender to or from which the in-vehicle processing apparatus 120 sends or receives the point group map 124A may be another in-vehicle processing apparatus 120 mounted in another vehicle or an apparatus managed by an organization that manages the parking space.

(10) The automatic parking system 100 may include a mobile terminal instead of the car navigation system 107 and identification information of a base station with which the mobile terminal communicates may be recorded instead of the latitude and the longitude. This is because the communication range of the base station is limited to several hundreds of meters, so that if the base station for performing the communication is the same, there is a high possibility that it is the same parking space.

(11) The cyclic feature included in the parking space data is not limited to the parking frames. For example, a plurality of straight lines constituting a pedestrians' crossing which is one of the road surface paint are also the cyclic feature. Furthermore, if the parking space data is composed of information of obstacles such as walls, which is acquired by a laser radar or the like, regularly aligned pillars are also the cyclic feature.

(12) Although in the aforementioned embodiment vehicles and humans that are mobile objects are not included in the landmarks, the mobile objects may be included in the landmarks. In that case, the landmarks which are the mobile objects and landmarks other than the mobile objects may be stored in a manner such that they can be identified.

(13) In the recording mode, the in-vehicle processing apparatus 120 may identify the detected landmarks and also records the identification results of the respective landmarks in the point group map 124A. For identification of the landmarks, shape information and color information of the landmarks which are obtained from the captured images, and further three-dimensional shape information of the landmarks by the known motion stereo technology are used. The landmarks are identified as, for example, the parking frames, the road surface paint other than the parking frames, curbs, guard rails, walls, and so on. Furthermore, the in-vehicle processing apparatus 120 may include the vehicles and humans, which are the mobile objects, in the landmarks and record their identification results in the point group map 124A in the same manner as other landmarks. In this case, the vehicles and the humans may be identified and recorded together as the "mobile objects" or the vehicles and the humans may be identified and recorded individually.

The embodiments of the present invention have been described above; however, the present invention is not limited to the above-described embodiments and various design changes can be made without departing from the spirit of the present invention described in the claims. For example, the aforementioned embodiments have been described in detail n order to explain the present invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, the configuration of another configuration can be added to, deleted from, or replaced with the above-mentioned part of the configuration.

REFERENCE SIGNS LIST 1, 1A, 1B: vehicle
100, 100A, 100B: automatic parking system
102: camera
107: car navigation system
108: vehicle speed sensor
109: steering angle sensor
110A: answering button
110B: automatic parking button
120: in-vehicle processing apparatus
121: arithmetic operation unit
121A: point group acquisition unit
121B: map generation unit
121C: position estimation unit
121D: mode switching unit
122A: outlier list
122B: local peripheral information
124: storage unit
124A: point group map
125: interface
130: vehicle control apparatus
IB: point group matching rate
IC: instantaneous matching degree
IW: overall matching degree

The invention claimed is:

1. An in-vehicle processing apparatus comprising:
a memory that stores point group data including a plurality of coordinates of points representing a part of an object in a first coordinate system by associating the point group data with latitude-longitude positioning information;
a sensor input circuit that acquires an output of a surrounding sensor for acquiring information of surroundings of a vehicle;
a movement sensor that acquires information about movements of the vehicle;
a local peripheral information creation circuit that generates local peripheral information including a position of the vehicle in a second coordinate system and a plurality of coordinates of points representing a part of an object in the second coordinate system on the basis of the information acquired by the sensor input circuit and the movement sensor, wherein the in-vehicle processing apparatus includes a map storage mode and a position estimation mode,
and wherein in the map storage mode, the surrounding sensor collects information about obstacles and a preset registered spot and stores the point group data in the memory when the vehicle approaches a preset registered spot and the point group data of the surroundings of the vehicle is not stored in the memory;
a position estimator circuit that estimates a relationship between the first coordinate system and the second coordinate system on the basis of the point group data and the local peripheral information and estimates the position of the vehicle in the first coordinate system, wherein in the position estimation mode the position estimator circuit estimate the position of the vehicle when the vehicle approaches the registered spot and the point group data of the surroundings of the vehicle is stored in the memory; and
a mode switch for causing a transition between the map storage mode and the position estimation mode, wherein when the vehicle approaches the registered spot and the point map group data of the surrounding of the vehicle is stored in the memory, the transition is made from the map storage mode to the position estimation mode, and wherein when the vehicle approaches the present registered spot and the point map group data of the surrounding of the vehicle is not stored in the memory, the transition is made from the position estimation mode to the map storage mode.

2. The in-vehicle processing apparatus according to claim 1, wherein the mode switch makes a transition to an automatic control mode to perform automatic control of the vehicle when the position of the vehicle is estimated by the position estimator circuit in the position estimation mode and an automatic control button of the vehicle is operated near the registered spot.

3. The in-vehicle processing apparatus according to claim 2, wherein when the position of the vehicle is lost in the position estimation mode or the automatic control mode, the mode switch switches the mode to a give-up mode to not perform any of the map storage mode, the position estimation mode, or the automatic control mode.

4. The in-vehicle processing apparatus according to claim 2, wherein in the automatic control mode, the automatic control of the vehicle is performed only when the position estimator circuit has succeeded in estimating the position of the vehicle and the position of the vehicle is within a specified range from the registered spot and while the automatic control button for automatically controlling the vehicle is pressed.

5. The in-vehicle processing apparatus according to claim 1, further comprising a selection circuit that selects an effective point group from point groups of the local peripheral information on the basis of a travel distance and trajectory shape of the vehicle, wherein the position estimator circuit performs matching between the effective point group of the local peripheral information selected by the selection circuit and the point group data and calculates the position of the vehicle in the first coordinate system.

6. The in-vehicle processing apparatus according to claim 1, wherein in the map storage mode, point group data around the registered spot is stored in the memory by operating a parking brake of the vehicle and pressing an answering button for storing the point group data in the memory.

* * * * *